(12) United States Patent
Hotta et al.

(10) Patent No.: US 6,794,334 B2
(45) Date of Patent: Sep. 21, 2004

(54) THERMO REVERSIBLE RECORDING MEDIUM, MEMBER HAVING INFORMATION MEMORIZING PART, THERMO REVERSIBLE RECORDING LABEL, METHOD OF AND APPARATUS FOR IMAGE PROCESSING

(75) Inventors: Yoshihiko Hotta, Tokyo (JP); Kunichika Moroboshi, Tokyo (JP); Fumio Kawamura, Tokyo (JP); Katsushi Sugiyama, Tokyo (JP); Katsuaki Kokubo, Tokyo (JP); Koji Kawai, Tokyo (JP); Kazuo Hosoda, Tokyo (JP); Masafumi Moriya, Tokyo (JP)

(73) Assignees: Ricoh Company, Ltd., Tokyo (JP); Miyashi Yushi Kabushiki Kaisha, Tokyo (JP)

( * ) Notice: Subject to any disclaimer, the term of this patent is extended or adjusted under 35 U.S.C. 154(b) by 333 days.

(21) Appl. No.: 09/877,140

(22) Filed: Jun. 8, 2001

(65) Prior Publication Data

US 2002/0045546 A1 Apr. 18, 2002

(30) Foreign Application Priority Data

Jun. 13, 2000 (JP) .................... 2000-176727

(51) Int. Cl.[7] ............................... B41M 5/20
(52) U.S. Cl. ....................... 503/201; 503/208
(58) Field of Search ................... 503/201, 208

(56) References Cited

U.S. PATENT DOCUMENTS

| 5,262,374 A | 11/1993 | Okabe et al. ............... 503/201 |
| 5,278,128 A | 1/1994 | Hotta et al. ................. 503/207 |
| 5,448,065 A | 9/1995 | Masubuchi et al. ...... 250/316.1 |
| 5,489,494 A | 2/1996 | Hotta et al. .................. 430/19 |
| 5,538,822 A | 7/1996 | Hotta et al. .................. 430/19 |
| 5,583,554 A | 12/1996 | Masubuchi et al. ......... 347/171 |
| 5,616,262 A | 4/1997 | Itoda et al. ................. 219/216 |
| 5,635,319 A | 6/1997 | Hotta et al. .................. 430/19 |
| 5,686,382 A | 11/1997 | Suzuki et al. ............... 503/201 |

(List continued on next page.)

FOREIGN PATENT DOCUMENTS

| EP | 0891875 | 1/1999 |
| JP | 55154198 | 12/1980 |
| JP | 63221087 | 9/1988 |
| JP | 63317385 | 12/1988 |
| JP | 1133781 | 5/1989 |
| JP | 2566 | 1/1990 |
| JP | 21363 | 1/1990 |
| JP | 32089 | 1/1991 |
| JP | 4366682 | 12/1992 |
| JP | 5294062 | 9/1993 |
| JP | 6255247 | 9/1994 |
| JP | 1016409 | 1/1998 |
| JP | 11058988 | 3/1999 |

OTHER PUBLICATIONS

U.S. patent application Ser. No. 09/406,069, Furuya et al., filed Sep. 24, 1999.
Database WPI Sec. Ch, Week 199813, Derwent Pub. Cl.A97, AN 1998–139944 abstract of JP 10 016409A (Jan. 1998).

Primary Examiner—Bruce H. Hess
(74) Attorney, Agent, or Firm—Cooper & Dunham LLP

(57) ABSTRACT

The thermo reversible recording medium comprises a substrate and a thermo sensible layer. This thermo sensible layer is made of resin and organic lower molecular weight substance and can become transparent-state or opaque-state depending on temperature. The organic lower molecular weight substance is a linear hydrocarbon-containing compound having no carboxyl group (A) and a linear hydrocarbon-containing compound having no carboxyl group (B) having a melting point lower than the melting point of the linear hydrocarbon-containing compound having no carboxyl group (A) by 20° C. or more.

20 Claims, 8 Drawing Sheets

U.S. PATENT DOCUMENTS

| | | | |
|---|---|---|---|
| 5,747,413 A | 5/1998 | Amano et al. | 503/201 |
| 5,868,821 A | 2/1999 | Torii et al. | 106/31.17 |
| 5,869,422 A | 2/1999 | Kazumi et al. | 503/207 |
| 5,880,445 A | 3/1999 | Mori et al. | 235/380 |
| 5,891,823 A | 4/1999 | Torii et al. | 503/216 |
| 5,942,377 A | 8/1999 | Torii et al. | 430/338 |
| 5,948,727 A | 9/1999 | Hotta et al. | 503/200 |
| 5,955,225 A | 9/1999 | Furuya et al. | 430/19 |
| 5,981,115 A | 11/1999 | Furuya et al. | 430/19 |
| 5,981,429 A | 11/1999 | Kawamura et al. | 503/207 |
| 6,090,192 A | 7/2000 | Torii et al. | 106/31.18 |
| 6,090,748 A | 7/2000 | Furuya et al. | 503/201 |
| 6,154,243 A | 11/2000 | Tatewaki et al. | 347/223 |

(FRONT VIEW)

(REAR VIEW)

THERMO REVERSIBLE RECORDING MEDIUM, MEMBER HAVING INFORMATION MEMORIZING PART, THERMO REVERSIBLE RECORDING LABEL, METHOD OF AND APPARATUS FOR IMAGE PROCESSING

FIELD OF THE INVENTION

The present invention relates to a thermo reversible recording medium, member having information memorizing part, thermo reversible recording label, and a method of and apparatus for image pressing for forming of deleting images repeatedly by utilizing a thermo sensible layer manifesting reversible change between transparent and non-transparent condition depending on temperature.

BACKGROUND OF THE INVENTION

Recently, attention has been given to a thermo reversible recording medium having a heat sensible layer of which transparency can be reversed based on temperature. When such a recording medium is used in display monitors, images can be repeatedly formed or deleted when desired.

As typical examples, there are known thermo reversible recording media obtained by dispersing an organic lower molecular weight substance such as a higher fatty acid and the like in a resin mother material such as a vinyl chloride-vinyl acetate copolymer. Such a medium is disclosed, for example, in Japanese Patent Application Laid-Open (JP-A) No. 55-154198.

However, in case of the above-mentioned thermo reversible recording medium the transparent-state temperature range in which transparency the medium achieves a transparent-state is as narrow as 2 to 4° C. Thus, this medium has a drawback that the transparent-state temperature range is too narrow to stably record and erase images. In attempting to widen the transparent-state temperature range, higher fatty acid, higher ketone or fatty ester and an aliphatic dicarboxylic acid in admixture may be used as suggested in, for example, JP-A Nos. 2-1363, 3-2809, 4-366682 or 6-255247. Since the transparent-state temperature range becomes wider, the temperature control becomes easier.

The thermo reversible recording media are often used in, for example, point cards (a card given to a customer by a shopkeeper and in which points are added each time some service is used). Such point cards are used repeatedly over a long period of time. Such a card may be put in pant pocket, purse or in table drawer. In other words, the card is stored under various conditions or environments.

However, if basic substances such as ammonia, amine and the like exist where the card has been stored, there is a problem that an opaque image cannot be formed even if the amount of such substances is extremely small. The reason for this is supposed that a carboxyl group of the organic lower molecular weight substance reacts with the basic substance resulting in formation of salts thereof. Therefore, the melting point of the organic lower molecular weight substance increases.

JP-A No. 5-294062 suggests use of higher ketone or fatty ester and a saturated aliphatic bisamide in admixture to make the transparent-state temperature range wider. Since organic lower molecular weight substance having a carboxyl group is not used, the influence by the basic substance is small, the temperature is somewhat wider, and erasing property is better. However, there is a drawback that the contrast is low.

Further, JP-A No. 11-58988 suggests, to decrease influence by a basic substance, use of organic lower molecular weight substance having lower melting point such as fatty ester and fatty acid metal salt such as copper stearate, or fatty amide and the like. However, if copper stearate is used, there is a drawback that the medium becomes blue colored blue due to blue color of the raw material. Moreover, if fatty amide is used, since the melting point of the fatty amide is not so higher, there is a drawback that the transparent-state temperature range becomes narrower.

SUMMARY OF THE INVENTION

It is an object of the present invention to provide a thermo reversible recording medium which can provide sufficient opacity even if it is stored in the presence of a basic substance. It is another object of the present invention to provide a thermo reversible recording medium which has a wider transparent-state temperature range, by which high contrast images can be formed or images can be erased irrespective of changes in environmental temperature. It is another object of the present invention to provide a thermo reversible recording label, a member having an information memorizing part and a reversible display part, an image processing method and an image processing apparatus, to which a thermo reversible recording medium, solution means of the first and second objects, is applied.

The thermo reversible recording medium of one aspect of this invention comprises a substrate and a heat sensible layer. This thermo sensible layer is made of resin and organic lower molecular weight substance and can reversibly achieve transparent-state or opaque-state depending on temperature. The organic lower molecular weight substance is a linear hydrocarbon-containing compound having no carboxyl group. The organic lower molecular weight substance may be any one or more of (1) linear hydrocarbon-containing compounds having a urethane bond, (2) linear hydrocarbon-containing compounds having a sulfonyl bond, (3) linear hydrocarbon-containing compounds having an oxalic diamide bond, (4) linear hydrocarbon-containing compounds having a diacylhydrazide bond, (5) linear hydrocarbon-containing aliphatic compounds having a urea bond and urethane bond, (6) linear hydrocarbon-containing aliphatic compounds having a urea bond and amide bond, (7) linear hydrocarbon-containing aliphatic compounds having a plurality of urea bonds, (8) linear hydrocarbon-containing cyclic compounds having a urea bond, (9) linear hydrocarbon-containing cyclic compounds having an amide bond.

Other objects and features of this invention will become apparent from the following description with reference to the accompanying drawings.

DESCRIPTION OF THE PREFERRED EMBODIMENTS

First, the mechanism of thermo reversibility of the recording medium of the present invention will be described.

The thermo reversible recording medium of the present invention has a substrate carrying thereon a thermo sensible layer manifesting reversible change between transparent-state and non-transparent or opaque-state depending on temperature. The transparent-state and the opaque-state are supposed to be formed according to the following mechanisms.

In the transparent condition, it is believed that particles of organic lower molecular weight substance dispersed in a mother material resin come in close contact with the resin. That is, there is no clearance or gap in or within the particles. Consequently, light entering from one side comes out from the other side without being scattered to give transparency. On the other hand, in the opaque-state, it is believed that particles of organic lower molecular weight substance are constituted of polycrystal made of fine crystals aggregated and there is clearance or gap at the interface of the crystals or at the interface between the particle and the resin. Consequently, light entering from any side is refracted or reflected and scattered at the interfaces between the clearance and the crystal and between the clearance and the resin, to give white appearance.

Figure 1:
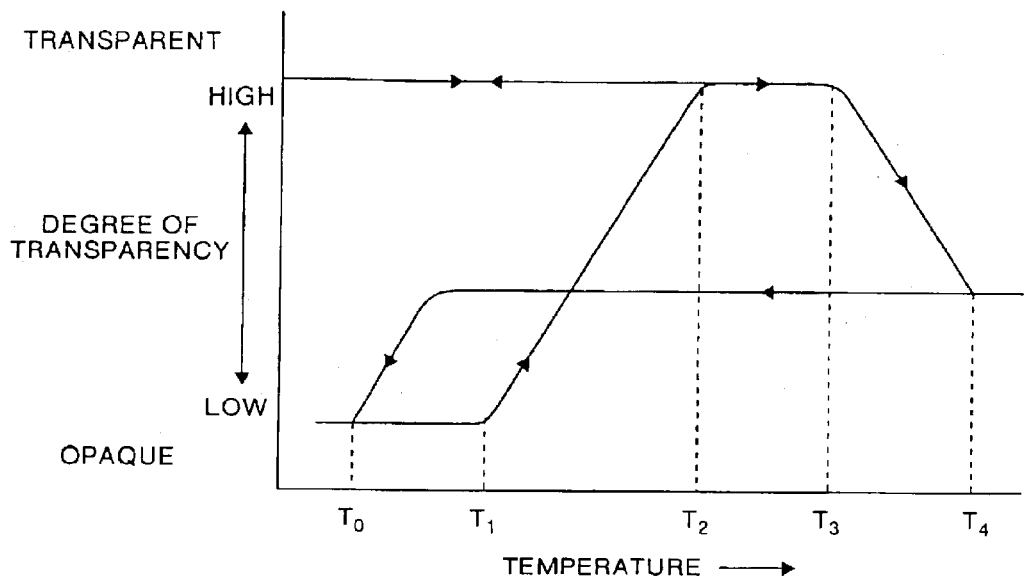
FIG. 1 is a graph showing change in degree of transparency by a thermo reversible recording medium of the present invention.

FIG. 1 is a view illustrating one example of change in the transparency due to a change in the temperature of the thermo reversible recording medium according to the present invention.

In FIG. 1, a heat sensitive layer containing a resin and an organic lower molecular weight substance dispersed in this resin as main components is, for example, in opaque-state at room temperatures of $T_0$ or less. When the material is heated, it begins to become transparent gradually from temperature $T_1$, and becomes completely transparent when the temperature is between $T_2$ and $T_3$. Once the material becomes transparent it remains transparent even if the material cools to room temperature $T_0$ or less.

The reason for this is believed to be as follows. That is, the resin begins to be soften from around temperature $T_1$, and with the progress of softening, the resin shrinks. As a result the clearance at the interface between the organic lower molecular weight substance and the particles decreases. Thus, transparency increases gradually, and the organic lower molecular weight substance becomes semi-transparent at temperatures from $T_2$ to $T_3$. The remaining clearance is buried with the organic lower molecular weight substance to give transparency. Because the material is cooled while there are seed crystals, crystallization begins at a relatively higher temperature. The resin is still in softened condition. As a result, the resin follows change in volume of particles by the crystallization. Thus, no clearance is formed between the particles and transparent-state is maintained.

When the resin is heated to temperature $T_4$ or more, it becomes semi-transparent, i.e. a state between total transparency and total opacity.

If the resin at the temperature $T_4$ is cooled, the resin returns to the original opaque-state without forming a transparent-state.

The reason for this is believed to be as follows. That is, after the organic lower molecular weight substance is completely melted at temperatures of $T_4$ or more, super-cooling condition is formed. Therefore, crystallization occurs at a temperature slightly higher than $T_0$, the resin can not follow the change in volume due to the crystallization, and clearance is generated between particles.

However, a temperature-transparency change curve shown in FIG. 1 is only a typical example, and transparency at each condition may change, by variation of materials, depending on the material.

A thermo reversible recording medium forming reversibly transparent-state and opaque-state depending on temperature as explained above has a basic structure as follows. That is, there is a substrate, and a thermo sensible layer containing a resin and an organic lower molecular weight substance as main components is provided on this substrate.

One object of the present invention is solved by using, the organic lower molecular weight substance is a linear hydrocarbon-containing compound (A) having no carboxyl group and it may be any one of the following compounds (1) to (9):

(1) linear hydrocarbon-containing compounds having a urethane bond, (2) linear hydrocarbon-containing compounds having a sulfonyl bond, (3) linear hydrocarbon-containing compounds having an oxalic diamide bond, (4) linear hydrocarbon-containing compounds having a diacylhydrazide bond, (5) linear hydrocarbon-containing aliphatic compounds having a urea bond and urethane bond, (6) linear hydrocarbon-containing aliphatic compounds having a urea bond and amide bond, (7) linear hydrocarbon-containing aliphatic compounds having a plurality of urea bonds, (8) linear hydrocarbon-containing cyclic compounds having a urea bond, or (9) linear hydrocarbon-containing cyclic compounds having an amide bond.

Namely, this linear hydrocarbon-containing compound (A) does not have a carboxyl group, and has a polar group as described below in the molecule.

Urethane bond (—NHCOO—), sulfonyl bond (—SO$_2$—), oxalic diamide bond (—NHCOCONH—), diacylhydrazide bond (—CONHNHCO—), urea bond (—NHCONH—) and amide bond (—CONH—).

It is preferable that this linear hydrocarbon-containing compound (A) does not have a hydroxyl group.

The linear hydrocarbon-containing compound (A) may be a mixture of two or more of the compounds (1) to (9) listed above.

It is preferable that the total carbon number of linear hydrocarbons of the linear hydrocarbon-containing compound (A) is preferably between 6 and 60, more preferably between 8 and 50.

It is preferable that, among linear hydrocarbon-containing compounds (A), (1), (2), (3), (4), (8) and (9) contain a cyclic structure such as a cyclic hydrocarbon (cyclohexane, cyclopentane and the like), an aromatic ring (benzene, naphthalene and the like), a heterocyclic ring (cyclic ether, furan, pyran, morpholine, pyrrolidine, piperidine, pyrrole, piridine, pirazine, piperazine, pyrimidine and the like), a condensed hetarocyclic ring (benzopyrrolidine, indole, benzooxazine, quinoline and the like), or the like.

Further, it is preferable that the end of a molecule has a methyl group.

It is preferable that the melting point of the linear hydrocarbon-containing compound (A) is preferably above 100° C. and below 180° C. More preferably, the melting point should be between 130° C. and 150° C.

When the melting point is too low, the transparent-state temperature range cannot be made wider so that the image can not be erased effectively. On the other hand, when the melting point is too high, sensitivity when forming an opaque image decreases undesirably.

Examples of the linear hydrocarbon-containing compound (A) include, but are not limited to, compounds of the following general formulae (1) to (9).

$$R_1-X-R_2-Y-R_3 \qquad (1)$$

In this general formula (1), at least one of X and Y represents a urethane bond, sulfonyl bond or urea bond, and the remaining one represents one selected from a urethane bond, sulfonyl bond, urea bond and amide bond. $R_1$ and $R_3$ represent $CH_3(CH_2)_m-$ or $CH_3(CH_2)_m-O-(CH_2)_n-$, and $R_2$ represents $-(CH_2)_m-$ or a group of the following general formula (i) or (ii), and m and n are preferably from 0 to 30.

(i)

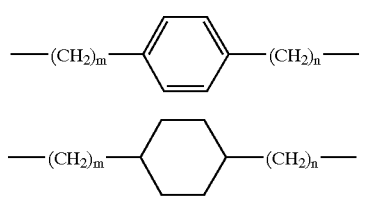
(ii)

$$R_1-X-R_3 \qquad (2)$$

In this general formula (2), X represents an oxalic diamide bond or diacylhydrazide bond, $R_1$ and $R_3$ represent $CH_3(CH_2)_m-$ or $CH_3(CH_2)_m-O-(CH_2)_n-$, and m and n are preferably from 0 to 30.

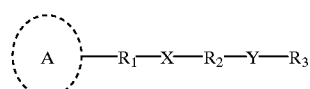
(3)

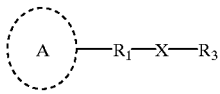
(4)

In these formulae (3) and (4), at least one of X and Y represents a urethane bond, sulfonyl bond, urea bond, amide bond, oxalic diamide bond or diacylhydrazide bond. $R_1$ and $R_2$ represent $-(CH_2)_m-$ or $-(CH_2)_m-O-(CH_2)_n-$, and $R_3$ represents $CH_3(CH_2)_m-$ or $CH_3(CH_2)_m-O-(CH_2)_n-$, [A] represents a phenyl group, cyclohexyl group or a group of the following general formulae (iii) to (v), and m and n are preferably from 0 to 30.

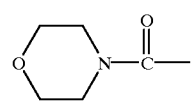
(iii)

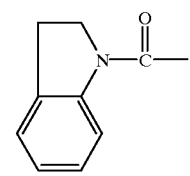
(iv)

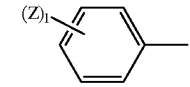
(v)

In these formulae, 1 is an integer from 1 to 3, $R_1OCO-$, $R_1O-$, $R_1$, and $R_1$ represents $CH_3(CH_2)_m-$ or $CH_3(CH_2)_m-O-(CH_2)_n-$, and m and n are preferably from 0 to 30.

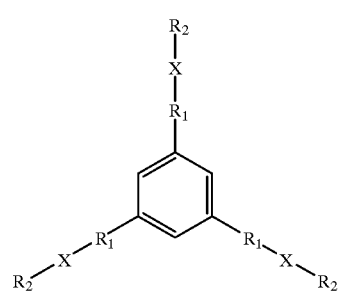
(5)

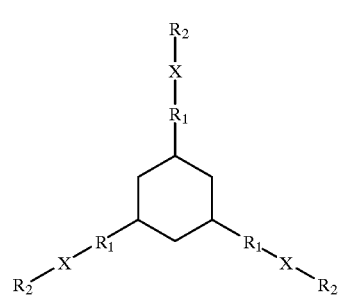
(6)

In these formulae (5) and (6), X represents a urethane bond, sulfonyl bond, urea bond, amide bond, oxalic diamide bond or diacylhydrazide bond. $R_1$ represents $-(CH_2)_m-$ or —$(CH_2)_m$—O—$(CH_2)_n$—, and $R_2$ represents $CH_3(CH_2)_m$— or $CH_3(CH_2)_m$—O—$(CH_2)_n$—, and m and n are preferably from 0 to 30.

Specific examples of the linear hydrocarbon-containing compound (A) include, but not limited to, compounds of the following general formulae (7) to (22).

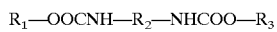  (7)

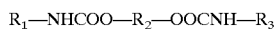  (8)

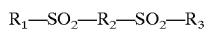  (9)

  (10)

  (11)

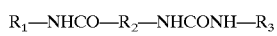  (12)

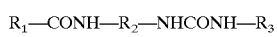  (13)

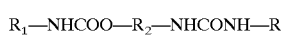  (14)

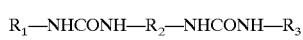  (15)

(16)
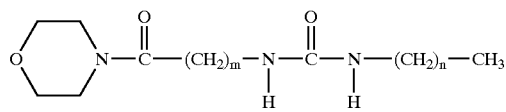

(17)
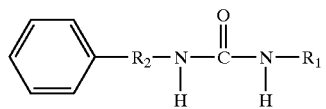

(18)
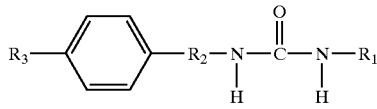

(19)
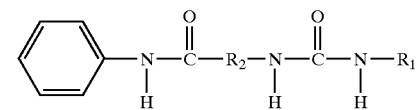

(20)
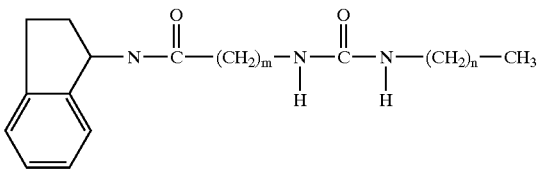

(21)
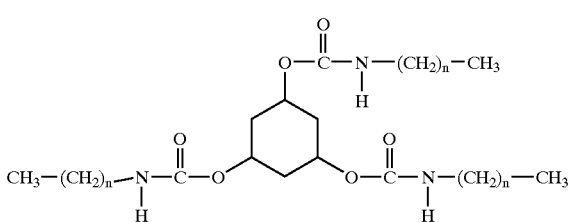

(22)
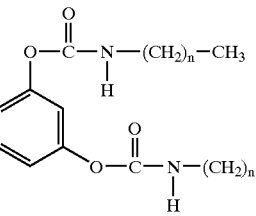

In these formulae (7) to (22), $R_1$ and $R_3$ represent $CH_3(CH_2)_m$— or $CH_3(CH_2)_m$—O—$(CH_2)_n$—, $R_2$ represents —$(CH_2)_m$— or a group of the above-mentioned general formula (i) or (ii), and m and n are preferably between 0 and 30.

Wherein, m and n are preferably from 1 to 30, more preferably from 3 to 26, further preferably from 5 to 22.

The total carbon number of linear hydrocarbons in the molecule is preferably 8 or more, more preferably 10 or more, further preferably 14 or more.

The total carbon number of linear hydrocarbons in the molecule is preferably 60 or less, more preferably 50 or less, further preferably 40 or less.

When the carbon number is too small, a problem occurs that compatibility with a resin is improved, a lower molecular weight particle is not formed easily, consequently, contrast decreases. On the other hand, when the carbon number is too large, a problem occurs that compatibility with a lower melting point and lower molecular weight substance lowers and the transparent-state temperature range can not be widened.

As the compound of the above-mentioned general formula (7), the following compounds are exemplified.

|  | Melting Point (MP) |
|---|---|
| $CH_3(CH_2)_{11}OOCNH(CH_2)_6NHCOO(CH_2)_{11}CH_3$ | 113° C. |
| $CH_3(CH_2)_{17}OOCNH(CH_2)_6NHCOO(CH_2)_{17}CH_3$ | 119° C. |
| $CH_3(CH_2)_{21}OOCNH(CH_2)_6NHCOO(CH_2)_{21}CH_3$ | 121° C. |

The compound of the above-mentioned general formula (8) may be any one of the following.

|  | MP |
|---|---|
| $CH_3(CH_2)_{17}NHCOO(CH_2)_2OOCNH(CH_2)_{17}CH_3$ | 115° C. |
| $CH_3(CH_2)_{17}NHCOO(CH_2)_4OOCNH(CH_2)_{17}CH_3$ | 119° C. |
| $CH_3(CH_2)_{17}NHCOO(CH_2)_6OOCNH(CH_2)_{17}CH_3$ | 111° C. |

|  | MP |
|---|---|
| $CH_3$—$(CH_2)_{17}$—NHCOO—$CH_2$—⟨cyclohexyl⟩—$CH_2$—OOCNH—$(CH_2)_{17}$—$CH_3$ | 121° C. |

The compound of the above-mentioned general formula (9) may be any one of the following.

| | MP |
|---|---|
| $CH_3(CH_2)_{11}SO_2(CH_2)_4SO_2(CH_2)_{11}CH_3$ | 149° C. |
| $CH_3(CH_2)_{17}SO_2(CH_2)_2SO_2(CH_2)_{17}CH_3$ | 150° C. |
| $CH_3(CH_2)_{17}SO_2(CH_2)_4SO_2(CH_2)_{17}CH_3$ | 148° C. |

The compound of the above-mentioned general formula (10) may be any one of the following.

| | MP |
|---|---|
| $CH_3(CH_2)_{11}NHCOCONH(CH_2)_{11}CH_3$ | 124° C. |
| $CH_3(CH_2)_{17}NHCOCONH(CH_2)_{17}CH_3$ | 121° C. |

The compound of the above-mentioned general formula (11) may be any one of the following.

| | MP |
|---|---|
| $CH_3(CH_2)_{10}CONHNHCO(CH_2)_{10}CH_3$ | 151° C. |
| $CH_3(CH_2)_{16}CONHNHCO(CH_2)_{10}CH_3$ | 134° C. |
| $CH_3(CH_2)_{16}CONHNHCO(CH_2)_{16}CH_3$ | 147° C. |
| $CH_3(CH_2)_{20}CONHNHCO(CH_2)_{16}CH_3$ | 136° C. |
| $CH_3(CH_2)_{20}CONHNHCO(CH_2)_{20}CH_3$ | 143° C. |

The compound of the above-mentioned general formula (12) may be any one of the following.

| | MP |
|---|---|
| $CH_3(CH_2)_{17}NHCO(CH_2)_4NHCONH(CH_2)_{17}CH_3$ | 144° C. |
| $CH_3O(CH_2)_3NHCO(CH_2)_{11}NHCONH(CH_2)_{17}CH_3$ | 140° C. |
| $CH_3CH_2O(CH_2)_3NHCO(CH_2)_{11}NHCONH(CH_2)_{17}CH_3$ | 135° C. |

The compound of the above-mentioned general formula (13) may be any one of the following.

| | MP |
|---|---|
| $CH_3(CH_2)_{16}CONH(CH_2)_6NHCONH(CH_2)_{17}CH_3$ | 149° C. |

The compound of the above-mentioned general formula (14) may be any one of the following.

| | MP |
|---|---|
| $CH_3(CH_2)_{17}NHCOO(CH_2)_2NHCONH(CH_2)_{17}CH_3$ | 127° C. |

The compound of the above-mentioned general formula (15) may be any one of the following.

| | MP |
|---|---|
| $CH_3(CH_2)_{17}NHCONH(CH_2)_6NHCONH(CH_2)_{17}CH_3$ | 177° C. |

The compound of the above-mentioned general formula (16) may be any one of the following.

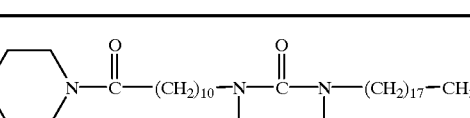

The compound of the above-mentioned general formula (17) may be any one of the following.

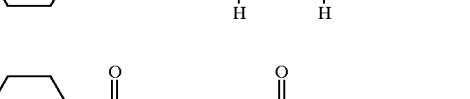

The compound of the above-mentioned general formula (18) may be any one of the following.

$CH_3-(CH_2)_{17}-NH-\overset{O}{\underset{}{C}}-NH-CH_2-\text{C}_6H_4-O-CH_3$    124° C.

The compound of the above-mentioned general formula (19) may be any one of the following.

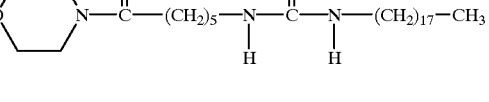

The compound of the above-mentioned general formula (20) may be any one of the following.

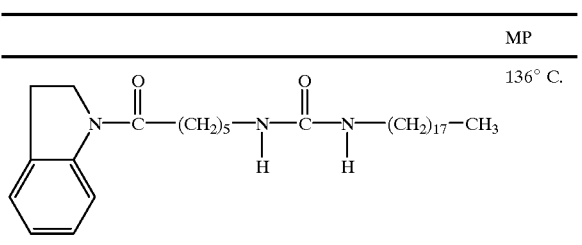

MP 136° C.

The compound of the above-mentioned general formula (21) may be any one of the following.

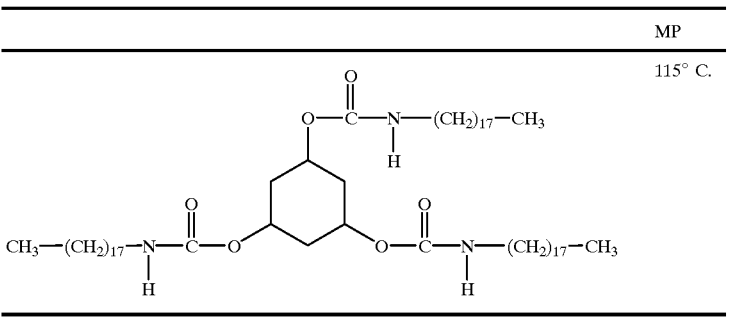

MP 115° C.

The compound of the above-mentioned general formula (22) may be any one of the following.

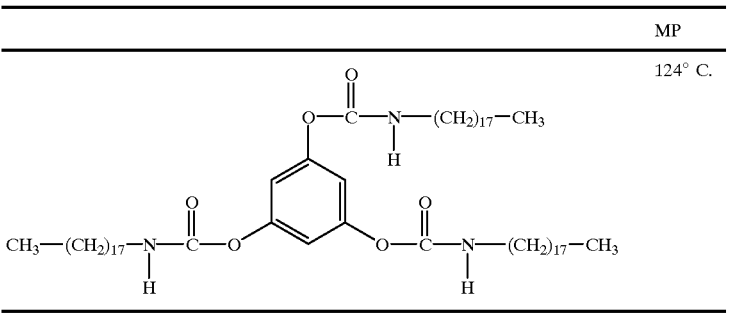

MP 124° C.

Examples of the method of preparing the above-mentioned linear hydrocarbon-containing compound (A) include, but not limited to, the following methods.

Synthesis of Compound in the General Formula (7):
Synthesis of $[CH_3(CH_2)_{17}OOCNH(CH_2)_6NHCOO(CH_2)_{17}CH_3]$ A solution of 20.1 g of stearyl alcohol and 5.1 g of hexamethylene diisocyanate in 125.5 g of tetrahydrofuran was stirred for 3 hours under reflux. The deposited crystals were filtrated, and re-crystallized from toluene, to obtain 17.7 g of the intended compound.

Synthesis of Compound in the General Formula (8):
Synthesis of $[CH_3(CH_2)_{17}NHCOO(CH_2)_4OOCNH(CH_2)_{17}CH_3]$ A solution of 2.6 g of 1,4-butanediol and 18.0 g of steary isocyanate in 103.0 g of tetrahydrofuran was stirred for 5 hours under reflux. The deposited crystals were filtrated, and re-crystallized from toluene, to obtain 17.5 g of the intended compound.

Synthesis of Compound in the General Formula (9):
Synthesis of $[CH_3(CH_2)_{17}SO_2(CH_2)_2SO_2(CH_2)_{17}CH_3]$ To a solution of 35.5 g of stearyl mercaptane and 8.5 g of potassium hydroxide in 177.5 g of ethanol was added 11.1 g of 1,2-dibromoethane dropwise at room temperature, and stirred for 5 hours under reflux. After completion of stirring, 275 g of a 0.8% hydrochloric acid aqueous solution was added at room temperature.

The deposited crystal was filtrated, washed with water and dried to obtain 18.4 g of 1,2-dioctadecylthioethane.

Then, a mixture of 18.4 g of 1,2-dioctadecylthioethane, 184 g of acetic acid and 184 g of hydrogen peroxide (35%) was stirred at 80 to 90° C. for 5 hours. The reaction solution was added into ion exchange water under room temperature, and the deposited crystal was filtrated, and re-crystallized from toluene, to obtain 10.6 g of the intended compound.

Synthesis of Compound in the General Formula (10):
Synthesis of $[CH_3(CH_2)_{17}NHCOCONH(CH_2)_{17}CH_3]$ To a solution of 53.5 g of stearylamine and 15.7 g of pyridine in 599.2 g of tetrahydrofuran was added under room temperature a solution of 12.0 g of oxalyl chloride in 120.0 g of tetrahydrofuran dropwise. After stirring, the mixture was stirred at room temperature for 5 hours. The deposited crystal was filtrated, washed with water and re-crystallized from toluene, to obtain 19.6 g of the intended compound.

Synthesis of Compound in the General Formula (11):
Synthesis of $[CH_3(CH_2)_{16}CONHNHCO(CH_2)_{17}CH_3]$ To a solution of 20.0 g of stearic hydrazide, 21.0 g of stearic acid, 10.3 g of 1-hydroxybenzotriazole in 205.0 g of tetrahydrofuran was added 9.3 g of diisopropylcarbodiimide dropwise at room temperature, and the mixture was stirred for 3 hours under reflux. The deposited crystal was filtrated, and re-crystallized from isopropyl alcohol, to obtain 23.9 g of the intended compound.

Synthesis of Compound in the General Formula (12):
Synthesis of [CH$_3$CH$_2$O(CH$_2$)$_3$NHCO(CH$_2$)$_{11}$NHCONH(CH$_2$)$_{17}$CH$_3$]

A solution of 30.5 g of octadecyl isocyanate and 21.4 g of 12-aminododecanoic acid in dimethylformamide was stirred at 60 to 70° C. for 8 hours. The deposited crystals was filtrated, and re-crystallized from toluene, and to a solution of 45.2 g of the resulted compound, 12.7 g of ethoxypropylamine and 15.6 g of 1-hydroxybenzotriazole in methyl ethyl ketone was added 17.8 g of diisopropylcarbodiimide dropwise at 50 to 60° C. and the mixture was stirred for 5 hours. The deposited crystals were filtrated, and re-crystallized from isopropyl alcohol to obtain 46.1 g of the intended compound.

Synthesis of Compound in the General Formula (17):
Synthesis of

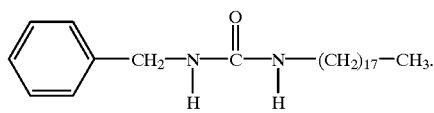

A solution of 14.8 g of octadecyl isocyanate and 6.1 g of benzylamine in methyl ethyl ketone was stirred for 6 hours under reflux. The deposited crystal was filtrated, and re-crystallized from isopropyl alcohol to obtain 17.2 g of the intended compound.

Synthesis of Compound in the General Formula (19):
Synthesis of

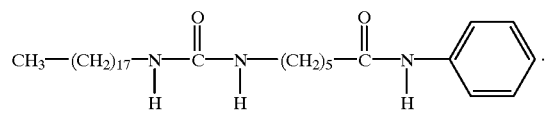

A solution of 14.1 g of octadecyl isocyanate and 6.2 g of 6-aminocapronic acid in dimethylformamide was stirred for 5 hours at 50 to 60° C. The deposited crystals were filtrated, and re-crystallized from toluene, and to a solution of 18.7 g of the resulted compound, 5.0 g of aniline ad 6.5 g of 1-hydroxybenzotriazole in methyl ethyl ketone was added 5.5 g of diisopropylcarbodiimide dropwise, and the mixture was stirred for 5 hours under reflux. The deposited crystal was filtrated, and re-crystallized using ethyl alcohol to obtain 16.3 g of the intended compound.

Synthesis of Compound in the General Formula (22):
Synthesis of

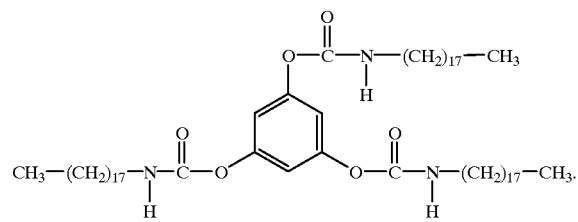

A solution of 4.3 g of benzene-1,3,5-triole and 33.4 g of octadecyl isocyanate in tetrahydrofuran was stirred for 8 hours under reflux. The deposited crystals were filtrated, and re-crystallized from toluene to obtain 25.6 g of the intended compound.

Another object of the present invention is solved by further using a linear hydrocarbon-containing compounds (B) having a melting point lower than the melting point of the linear hydrocarbon-containing compound (A) by 20° C. or more and having no carboxyl group, in addition to the linear hydrocarbon-containing compound (A), as the organic lower molecular weight substance.

This linear hydrocarbon-containing compound (B) may be one compound or a combination of two or more compounds.

The melting temperature of the linear hydrocarbon-containing compound (B) should preferably be 50° C. or more and less than 100° C. The melting point should more preferably 60° C. or more, further preferably 70° C. or more, and more preferably 90° C. or less.

If the melting point is too low, the image does not withstand heat. On the other hand, when the melting point is too high, the transparent-state temperature range cannot widened, and the image cannot be erased effectively.

The mixing ratio by weight of the linear hydrocarbon-containing compound (A) to the linear hydrocarbon-containing compound (B) should preferably be from 80:20 to 1:99.

The proportion of the linear hydrocarbon-containing compound (B) is more preferably 97 or less, further preferably 95 or less, more particularly preferably 90 or less. Further, the proportion of the compound (B) should preferably be 30 or more, more preferably 40 or more, further preferably 50 or more.

The linear hydrocarbon-containing compounds (A) and (B) may be used each alone or in admixture of two or more.

When the proportion of the linear hydrocarbon-containing compound (B) is too high, even in the clearing temperature range, such difference in transparency occurs that transparency is higher when the temperature is low and transparency is lower when the temperature is high. As a result uniform transparency can not be accomplished.

On the other hand, when the proportion of the linear hydrocarbon-containing compound (B) is too low, sufficient transparency cannot be obtained.

The linear hydrocarbon-containing compound (B) preferably has nohydroxyl group, and preferably has a methyl group at the end of the molecule.

The linear hydrocarbon-containing compound (B) may be, but are not limited to, fatty esters, ketones having a higher alkyl group, dibasic acid esters, polyhydric alcohol difatty esters, aliphatic monoamide compounds, aliphatic monourea compounds.

Specific examples of the linear hydrocarbon-containing compound (B) are listed below.

The fatty ester may be octadecyl laurate, dococyl laurte, dococyl myristate, dodecyl palmitate, tetradecyl palmitate, pentadecyl palmitate, hexadecyl palmitate, octadecyl palmitate, triacontyl palmitate, octadecyl palmitate, docodyl palmitate, vinyl stearate, propyl stearate, isopropyl stearate, butyl stearate, amyl stearate, heptyl stearate, octyl stearate, tetradecyl stearate, hexadecyl stearate, heptadecyl stearate, octadecyl stearate, dococyl stearate, hexaconyl stearate, triacontyl stearate, dodecyl behenate, octadecyl behenate, dococyl behenate, tracocyl lignocerate, myricyl melissate.

The ketone having a higher alkyl group may be 8-pentadecanone, 9-heptadecanone, 10-nonadecanone, 11-heneicosanone, 12-tricosanone, 14-heptadosanone, 16-hentriacontanone, 18-pentatriacontanone, 22-tritetracontanone, 2-pentadecanone, 2-hexadecanone, 2-heptadecanone, 2-octadecanone, 2-nonadecanone.

The dibasic acid ester is preferably diesters, and it is represented by the following general formula (I).

In this formula, R and R' represent an alkyl group, and the carbon number of this alkyl group should preferably be from 1 to 30, and more preferably from 1 to 22. R and R' may be the same or different. N should preferably be from 1 to 30, more preferably from 2 to 20.

Specifically, succinic acid diester, adipic acid diester, sebacic acid diester, 1,18-octadecamethylenedicarboxylic acid ester and the like are listed.

As the polyhydric alcohol difatty ester, those represented by the following general formula (II) are listed.

$$CH_3(CH_2)_{m-2}COO(CH_2)_nOOC(CH_2)_{m-2}CH_3 \quad (II)$$

In this formula, n should be preferably from 2 to 40, further preferably from 3 to 30, and more particularly preferably from 4 to 22. m should preferably be from 2 to 40, further preferably from 3 to 30, and more particularly preferably from 4 to 22.

Specifically, 1,3-propanediol dialkanoic acid ester, 1,6-hexanediol dialkanoic acid ester, 1,10-dicanediol dialkanoic acid ester, 1,18-octadecanediol dialkanoic acid ester and the like are listed.

As the fatty monoamide, those represented by the following general formula (III) are listed.

$$R_1-CONH-R_2 \quad (III)$$

In this formula, $R_1$ represents a linear hydrocarbon chain having 1 to 25 carbon atoms, $R_2$ represents a linear hydrocarbon chain having 1 to 26 carbon atoms, a methylol group or hydrogen, and at least any one of $R_1$ and $R_2$ is a linear hydrocarbon chain having 10 or more carbon atoms.

Specifically, N-lauryllauric amide, N-palmitylpalmitic amide, N-stearylpalmitic amide, N-behenylpalmitic amide, N-palmitylstearic amide, N-stearylstearic amide, N-behenylstearic amide, N-palmitylbehenic acid, N-stearylbehenic amide, N-behenylbehenic amide and the like.

As the aliphatic urea compound, those represented by the following general formula (IV) are listed.

$$R_3-NHCONH-R_4 \quad (IV)$$

In this formula, $R_3$ and $R_4$ represent an alkyl group, alicyclic group or aromatic group, and at least any one of them is a linear hydrocarbon chain having 1 to 26 carbon atoms.

Specifically, N-butyl-N-stearylurea, N-phenyl-N-stearylurea, N-stearyl-N-stearylurea, N-behenyl-N-stearylurea, N-stearyl-N-behenylurea, N-behenyl-N-behenylurea and the like are listed.

It is preferable that the thermo reversible recording medium of the present invention has the following (i) to (iii) together as the condition manifesting reversible change between transparent-state and opaque-state depending on temperature:

(i) the clearing upper limit of the transparent-state temperature is 110° C. or more, (ii) the temperature difference between the upper limit of the transparent-state temperature and the lower limit of the opaque-state temperature is 20° C. or less, (iii) the transparent-state temperature range is 30° C. or more.

The upper limit of the transparent-state temperature ($T_{WX}$), lower limit of the opaque-state temperature ($T_{VO}$), temperature difference ($\Delta T_{WV}$) between this upper limit temperature and the lower limit temperature, temperature ($T_{WD}$) at which the transparent-state starts, and the range of the transparent-state temperature ($\Delta T_Z$) are determined as described below. First, an opaque thermo reversible recording medium is prepared.

If this medium is transparent or it is not sufficiently opaque, the medium is required to be made opaque beforehand. The medium may be made opaque by heating, for example, by putting the medium to a hot plate for 10 to 30 seconds.

It is checked visually whether the medium has become completely opaque. It may be advantageous to heat the medium again at somewhat higher temperature (for example, temperature higher by 10° C.) and check the opaque-state. If the degree of opacification is the same before and after this heating, it is confirmed that the temperature of the previous temperature is temperature sufficient to cause opacification.

If the degree of opacification is higher at the previous and later heating, it will mean that the medium has not become completely opaque. In this case, it may be recommendable to heat the medium at still higher temperature and repeat the same procedure until the medium becomes completely opaque.

Then, this opaque recording medium is heated at varied temperatures to determine the temperature at which transparent-state occurs. Such heating may be performed using a heat gradient tester. A heat gradient tester, for example, manufactured by Toyo Seiki K.K., HG-100 is known. This heat gradient tester has 5 heating blocks. The temperature in each block can be set differently, the heating time and pressure can also be controlled, and a medium can be heated at 5 different temperatures simultaneously under set conditions.

Specifically, the heating time is 1 second, the pressure in heating is about 2.5 kg/cm, and the heating temperature is changed at a constant temperature interval of 1 to 5° C. from lower temperature at which whiteness does not change by heating to temperature at which sufficient opacification occurs.

To prevent sticky adhesion of a medium to a heating block, a thin film (10 μm or less) of polyimide and polyamide may also be place on the block.

Figure 2:
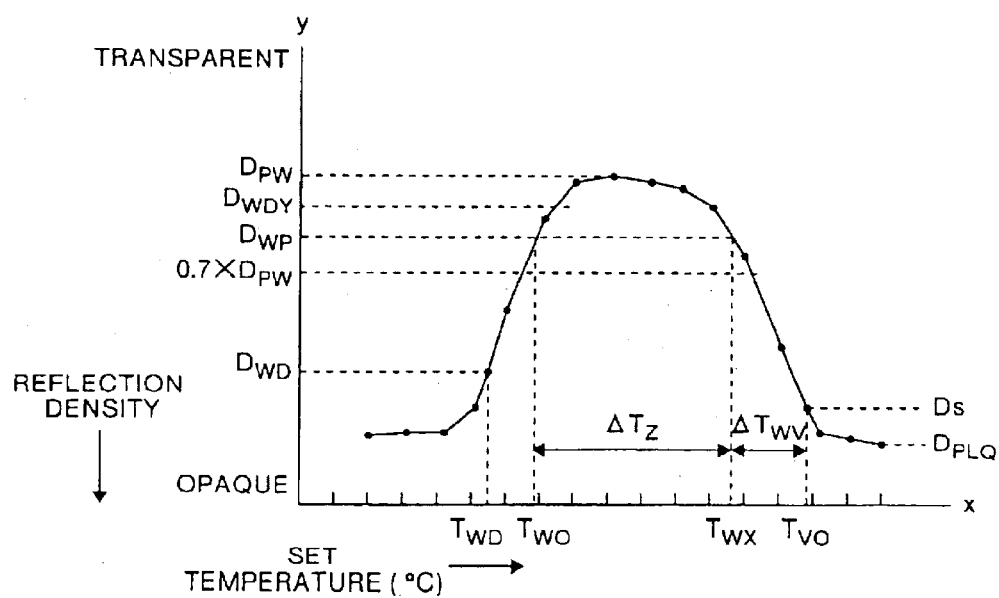
FIG. 2 is a graph illustrating the clearing upper limit of the transparent-state temperature, lower limit of the opaque-state temperature, temperature at which the transparent-state begins and temperature range in which the transparent-state is maintained according to the thermo reversible recording medium of the present invention.

After thus heated, a medium is cooled to room temperature, and the concentration of heated part at each temperature is measured using Macbeth RD-914 reflection densitometer, and a graph is made in which the set temperature set in the heat gradient tester is plotted along the abscissa and the reflection density is plotted along the vertical axis as shown in FIG. 2.

FIG. 2 is a graph showing the relation between the temperature and the reflection density. If the thermo reversible recording medium is prepared using a transparent substrate, then a sheet absorbing light or a sheet manifesting regular reflection of light obtained by vapor-depositing a metal such as Al and the like is placed on the rear surface of this medium.

This graph is completed by joining the plotted points with a line. As shown FIG. 2, usually such a graph will have a trapezoidal shape.

These data is influenced by the thickness and raw material of the thermo sensible layer and the substrate.

The thickness of the medium will have no influence if it is 300 μm or less, and approximately the same data will be obtained. On the other hand, if the thickness is not less than 300 μm, it may be recommendable to shave or peel the substrate to reduce the thickness to 300 μm or less, or the data may corrected based on the thickness.

The raw material is not restricted providing it is mainly polymer. However, if the raw material is a metal then appropriate correction is necessary.

The above-mentioned upper limit temperature and lower limit temperature and the like can be obtained based on the graph in FIG. 2.

First, the maximum reflection density ($D_{PD}$) is read from this graph. Then, a line of $y=0.7 \times D_{PD}$ is drawn, and points on this graph that have higher density than the density represented by this line are selected.

The number of such points is preferably from 5 to 20.

If the number of such points is small, then the later calculation result becomes incorrect.

If the number of plotting points is small, it is necessary to increase the number of points by reducing the temperature interval at the time of heating by the above-mentioned heat gradient tester.

Of the selected plotting points, the same number of points of larger concentration values and points of smaller concentration values are removed respectively, and the remaining concentration values are averaged to obtain average transparent concentration ($D_{WDY}$).

The proportion of removal of high density values and low density values is from 10 to 30%, preferably from 15 to 25%, respectively, based on the selected plotting points.

By thus removing high and low density values, a correct value of reflection density of the medium can be calculated.

Then, the transparent-state lower limit density ($D_{WP}$) is calculated using to the following numerical formula (1)

$$D_{WP}=D_{WDY}-0.2\times(D_{WDY}-D_{PLQ}) \quad (1)$$

Here, $D_{PLQ}$ means the maximum opaque-state density, and it is calculated from the average value of densities of adjacent 3 points which have reached within 0.3 during raising temperature. $D_{WP}$ represents, when at this density or more, a density at which looks almost transparent visually. Further, a line of $y=D_{WP}$ is drawn on the graph, and the crossing points thereof with the density-temperature curve are obtained. Of these crossing points, the one that represents lower temperature is taken as the transparent-state lower limit temperature ($T_{WO}$) and the one of that represents higher temperature is taken as transparent-state upper limit temperature ($T_{WX}$). The transparent-state temperature range ($\Delta T_Z$) is calculated using the following numerical formula (2).

$$\Delta T_{(W)Z}=T_{WX}-T_{WO} \quad (2)$$

The opaque-state upper limit temperature (Ds) is calculated using the following numerical formula (3).

$$D_S=D_{PLQ}+0.1\times(D_{WDY}-D_{PLQ}) \quad (3)$$

A line of y=Ds is drawn on the graph, and the temperature at a crossing point thereof with part of the density-temperature curve over which transparency changes to opacification is taken as the opaque-state lower limit temperature ($T_{VO}$).

The difference ($\Delta T_{WV}$) between the transparent-state upper limit temperature and the opaque-state lower limit temperature is calculated according the following numerical formula (4).

$$\Delta T_{WV}=T_{VO}-T_{WX} \quad (4)$$

The density when the transparent-state starts ($D_{WD}$) is calculated using to the following numerical formula (5).

$$D_{WD}=D_{PLQ}+0.25\times(D_{WDY}-D_{PLQ}) \quad (5)$$

The temperature when the transparent-state starts ($T_{WD}$) is obtained from crossing points of $y=D_{WV}$ with the graph as shown in FIG. 2.

The transparent-state upper limit temperature ($T_{WX}$) should preferably be 110° C. or more, and further preferably 115° C. or more.

When the transparent-state upper limit temperature $T_{WX}$ rises, widening of the transparent-state temperature range becomes possible without lowering image durability.

The transparent-state upper limit temperature ($T_{WX}$) should preferably be 120° C. or more, further preferably 125° C. or more, and more particularly preferably 130° C. or more.

When this temperature is higher, printing sensitivity increases.

The transparent-state upper limit temperature $T_{WX}$ should preferably be 170° C. or less, further preferably 160° C. or less, more particularly preferably 150° C, or less.

When this temperature is lower, the printing sensitivity increases.

The difference ($\Delta T_{WV}$) between the transparent-state upper limit temperature and the opaque-state lower limit temperature should preferably be 20° C. or less.

If the difference $T_{WV}$ is larger than this, temperature to cause opacification increases than necessary, consequently, in forming an opacified image, extremely high energy is necessary, and if formation of an image and deletion of the image are repeated, the surface of a medium is injured and the degree of opacification of the image lowers.

The temperature difference $\Delta T_{WV}$ should preferably be 15° C. or less, more preferably 10° C. or less.

The transparent-state start temperature ($T_{WD}$) should preferably be less than 95° C., further preferably 90° C. or less, and more particularly preferably 85° C. or less.

The transparent-state start temperature $T_{WD}$ should preferably be 70° C. or more, more preferably 75° C. or more.

When this temperature is lower, the image can be erased effectively, and when higher, image durability is improved.

The transparent-state temperature range ($\Delta T_Z$) should preferably be 30° C. or more.

When the transparent-state temperature range $\Delta T_Z$ is smaller than this, the image can not be erased effectively.

The transparent-state temperature range ($\Delta T_Z$) should more preferably be 40° C. or more, further preferably 45° C. or more, and more particularly preferably 50° C. or more.

When the transparent-state temperature range is larger, the image can be erased effectively.

The transparent-state temperature range $\Delta T_Z$ should preferably be 100° C. or less, further preferably 90° C. or less, and more particularly preferably 80° C. or less.

Particularly, when the transparent-state temperature range ($\Delta T_Z$) is larger, there is a merit that the image can be erased uniformly even if the processing speed is increased.

The transparent-state temperature range $\Delta T_Z$ should preferably be 60° C. or more, and more preferably 70° C. or more. Particularly, when the transparent-state temperature range ($\Delta T_Z$) is larger, there is a merit that the image can be erased uniformly even if the processing speed is increased.

Thus, the transparent-state temperature range $\Delta T_Z$ should preferably be 60° C. or more, and more preferably 70° C. or more.

The maximum average particle size of an organic lower molecular weight substance in the thermo sensible layer should preferably be 2.5 μm or less, and further preferably 2.0 μm or less. This maximum average particle size represents dispersed condition of particles of an organic lower molecular weight substance dispersed in a polymer matrix resin of the thermo sensible layer, When this size is small it means excellent dispersed condition, that is, uniform dispersion of the particles. When the maximum average particle size is smaller, the initial image is more opaque and the image can be erased more effectively, and also the contrast of the image improved.

The maximum average particle size is measured by the following method. First, a recording material is embedded in an epoxy resin, and a ultra thin sliced sample is made using a diamond cutter. Then, any 5 positions on the section of the thermo sensible layer of this sample were observed using a transmission electron microscope (hereinafter, called TEM, H-9000 manufactured by Hitachi, Ltd.) at an acceleration voltage of 300 kV, and this sample is photographed at a magnification of 10000. The number of larger particles in a 10% range based on the total number of an organic lower molecular weight substance in the area of this photograph image (10 cm×10 cm) is determined, and the average particle size is calculated from particle sizes of particles in this 10% range. This measurement is conducted on the above-mentioned 5 positions, and the average particle size is calculated on each position. The average value of 5 average particle sizes is used as the maximum average particle size. If the particle of the organic lower molecular weight substance in the area of the photograph image is not in uniform circular form, the maximum particle size of particles is used. Further, when particles in the area of the photograph image are remarkably large and their number is less than 10, the particle size of the biggest one of them was measured, and used as the maximum average particle size.

The substrate is not particularly restricted, and films or plates made of synthetic resins such as polyester, polyvinyl chloride, polyimide, further, metal deposited films obtained by vapor-depositing metals such as aluminum and the like on these materials, are exemplified.

The resin as a mother material used in the thermo sensible layer is a material which forms a layer in which an organic lower molecular weight substance is uniformly dispersed and kept and exerts an influence on the transparency at the maximum transparency.

Therefore, a resin mother material preferable includes a resin having excellent transparency, mechanical stability and excellent film forming property.

This resin preferably has a glass transition temperature preferably of 50° C. or more, further preferably 60° C. or more, and more particularly preferably of 70° C. or more.

Further, the glass transition temperature should preferably be less than 100° C., and more preferably less than 90° C. When the glass transition temperature is too low, the image durability decreases. When the glass transition temperature is too high, the image can not be deleted effectively.

This resin has a gel proportion preferably of 30% or more, further preferably of 50% or more, more particularly preferably of 50% or more, and still more particularly preferably of 80% or more.

The gel proportion means a rate of production of gel when resin solutes lose independent mobility due to mutual action in a solvent and aggregate to form solidified condition (gel).

When the gel proportion is small, repeating durability decreases. For improving gel proportion, it may be advantageous that a hardenable resin which is hardened by heat, UV, EB and the like is mixed in a resin, or a resin itself is cross-linked.

The gel proportion may be measured as follows. A film is peeled from the substrate and the weight of the film is measured ("initial weight"). Then, the film is clamped by 400 mesh wire gauzes and immersed in a solvent in which a resin before cross-linking is soluble for 24 hours, then, dried in vacuo, and the weight after drying is measured.

The gel proportion is calculated using the following formula.

$$\text{Gel proportion (\%)} = [\text{weight after drying (g)/initial weight (g)}] \times 100$$

The gel proportion is calculated by excluding the weights of the particles other than the particles of the resin in the thermo sensible layer such as the particles of organic lower molecular weight substance.

If the weight of the organic lower molecular weight substance is not previously known, it may be calculated as follows. For example, area ratio occupying unit area is measured by observation of section by TEM, SEM and the like and weight ratio is calculated from specific gravities of the resin and the organic lower molecular weight substance. Furthermore, the weight of an organic lower molecular weight substance is calculated from the weight ratio, and then the value of gel proportion is calculated.

When the reversible thermo sensible layer is formed on the substrate and other layers such as a protective layer and the like are laminated on this, or when other layer is present between the substrate and the thermo sensible layer, then the film thickness of the reversible thermo sensible layer and the other layers may be obtained using the method explained above, that is, by observing the section by TEM, SEM and the like. For example, the surface is cut to a depth corresponding to thickness of other layers to expose the surface of the reversible thermo sensible layer, and further, the reversible thermo sensible layer is peeled, and the gel proportion is measured in the same manner as explained above.

Further, when the protective layer and the like made of a ultraviolet ray-hardening resin and the like are placed on the top of the thermo sensible layer, it is necessary, for preventing mixing of this layer to the utmost, to shave the surface to a depth corresponding to the thickness of the protective layer and to slightly shave also the surface of the thermo sensible layer to prevent influence on the value of gel proportion.

It is preferable that this resin is cross-linked. When the resin is cross-linked, the thermo recording medium does not easily manifest change of the structure in the thermo sensible layer even if printing and deleting are repeated, and does not cause reductions in the degree of opacity, transparency and the like, meaning improvement in repeating durability.

When the resin is cross-linked, it is preferable that the resin contains a functional group such as a hydroxyl group, carboxyl group, epoxy group, acryloyl group, methacryloyl group and the like.

As the methods of cross-linking method, there are known the methods of thermal cross-linking, irradiation with UV and EB, etc. Also, it is preferable to add a cross-linking agent such as an isocyanate compound, functional acryl or methacryl monomer and the like, to cause cross-linking.

As this resin, there are exemplified vinyl chloride-based copolymers such as polyvinyl chloride, vinyl chloride-vinyl acetate copolymer, vinyl chloride-vinyl acetate-vinyl alcohol copolymer, vinyl chloride-vinyl acetate-maleic acid copolymer, vinyl chloride-acrylate copolymer and the like; vinylidene chloride-based copolymers such as polyvinylidene chloride, vinylidene chloride-vinyl chloride copolymer, vinylidene chloride-acrylonitrile copolymer and the like; polyesters; polyamides; polyacrylate or polymethacrylate or acrylate-methacrylate copolymer; silicone resins and the like.

These resins may be used alone or in admixture of two or more.

When the resist is a combination of a thermoplastic resin having a hydroxyl group with an isocyanate compound, it is preferable that a linear isocyanate compound and a cyclic isocyanate compound are mixed and used.

When a linear isocyanate compound is solely used, a resin cross-linked becomes usually flexible and deleting property increases. However, when the thermo sensible layer is too soft, such a demerit as reduction in repeating durability and image heat resistance occurs.

However, when only a cyclic isocyanate compound is used, there are defect that the cross-linked resin becomes rigid, repeating durability and image heat resistance are improved, however, deleting property lowers.

By use of a linear isocyanate compound and a cyclic isocyanate compound in admixture, deleting property, durability and heat resistance can be satisfied simultaneously.

The mixing ratio of a linear isocyanate compound to a cyclic isocyanate compound should preferably be from 90:10 to 10:90, further preferably from 90:10 to 30:70, and more particularly preferably from 80:20 to 30:70, by weight.

When the proportion of a linear isocyanate compound is larger, deletion rate and maximum deletion tendency are improved, resulting in possibility of improvement in contrast of the image.

As the linear isocyanate compound, for example, those obtained by reacting a linear compound having a hydroxyl group such as triol and the like with an aliphatic isocyanate such as hexamethylene diisocyanate and the like directly or via a single or a plurality of ethylene oxides or propylene oxides are listed.

A linear isocyanate compound has a molecular weight preferably of 500 or more, more preferably of 700 or more, further preferably of 1000 or more.

Further, the molecular weight of the linear isocyanine compound should preferably be 5000 or less, further preferably 4000 or less, and more particularly preferably 3000 or less.

When the molecular weight is too small, the cross-linked film does not easily get a flexible structure, consequently, deleting property decreases. When the molecular weight is too large, molecules cannot move easily, consequently, the degree of cross-linking decreases to lower durability.

The molecular weight per one isocyanate group should preferably be 250 or more, further preferably 300 or more, and more particularly preferably 400 or more.

Further, the molecular weight per one isocyanate group should preferably be 2000 or less, further preferably 1500 or less, and more particularly preferably 1000 or less.

When the molecular weight per one isocyanate group is too small, a cross-linked film does not easily get the flexible structure, consequently, deleting property decreases. When the molecular weight is too large, molecules cannot move easily, consequently, the degree of cross-linking decreases to lower durability.

The cyclic isocyante compound is an isocyanate compound having a benzene ring or isocyanurate ring.

Among them, a type having an isocyanurate ring is suitably used since it shows no yellowing.

It is preferable that also a cyclic isocyanate compound have a linear structure such as an alkylene chain and the like other than a cyclic structure.

The molecular weight of a cyclic isocyanate compound should preferably be 100 or more, more preferably 200 or more, and more particularly preferably 300 or more. Further, it is should preferably be less than 1000, and further preferably less than 700.

When this molecular weight is too small, the compound evaporates by heat in forming a film, and cross-linking of the film becomes impossible and durability decreases. When this molecular weight is too large, a rigid structure cannot be formed and durability decreases. As the mixture of a linear isocyanate compound and a cyclic isocyanate compound, the above-mentioned materials may be mixed and used, or a commercially available mixture may be used.

Examples of the commercially available mixture include, but not limited to, "Coronate 2298-90T" manufactured by Nippon Polyurethane K. K., and the like.

The heat sensible layer of the thermo reversible recording medium of the present invention has a thickness of preferably from 1 to 30 μm, further preferably from 2 to 20 μm, and more particularly preferably from 4 to 15 μm. When the thermo sensible layer is too thick, distribution of heat is generated in the layer and uniform clearing becomes difficult. When the thermo sensible layer is too thin, the degree of opacification lowers, to decrease contrast.

The degree of opacification can be increased by increasing the amount of fatty acids in the recording layer and cross-linking the resin in the thermo sensible layer.

The ratio by weight of an organic lower molecular weight substance to the resin in the thermo sensible layer should preferably be from about 2:1 to 1:16, further preferably from 1:2 to 1:8, more particularly preferably from 1:2 to 1:5, still more particularly preferably from 1:2 to 1:4 and most preferable is from 1:2.5 to 1:4.

When the proportion of a resin is not more than the above-mentioned value, it is difficult to form a film in which an organic lower molecular weight substance is held in a resin, and when the proportion is not less than the above-mentioned value, opacification becomes difficult since the amount of an organic lower molecular weight substance is small.

In the present invention, a protective layer can be provided on a thermo sensible layer for protecting the thermo sensible layer.

The thickness of this protective layer is appropriately from 0.1 to 5 μm. The protective layer may be prepared using the raw material such as silicone-based rubber or silicone resins as described in JP-A No. 63-221087, polysiloxane graft polymers as described in JP-A No. 63-317385, ultraviolet ray-curing resins or electron beam-curing resins as described in JP-A No. 02-566, and the like.

Further, the protective layer can contain an organic or inorganic filler.

Further, an intermediate layer can be provided between the protective layer and the thermo sensible layer as described in JP-A No. 1-133781, for protecting the thermo sensible layer from a solvent and monomer components and the like in a protective layer forming solution.

This intermediate layer may be prepared using the raw material such as resins used in a thermo sensible layer, and in addition, thermosetting resins, thermoplastic resins, UV-curing resins and EB-curing resins can be used. As such resins, polyethylene, polypropylene, polystyrene, polyvinyl alcohol, polyvinyl butyral, polyurethane, saturated polyester, unsaturated polyester, epoxy resin, phenol resin, polycarbonate, polyamide and the like are listed. The thickness of the intermediate layer should preferably be from about 0.1 to 2 μm, and when it is 0.1 μm or more, the effect of a protective layer can be maintained, and when 2 μm or more, heat sensitivity does not lower.

Further, a layer achieving regular reflection of light can be provided between the substrate and the thermo sensible layer and the like to improved contrast. This light reflection layer can be usually formed by a method such as vapor-deposition of metal, and the like. Thickness of this layer should preferably be from about 100 to 1000 Ångstroms.

The thermo reversible recording label of the present invention has an adhesive layer or a sticker layer provided on the opposites surface to a surface on which the thermo sensible layer is provided on the substrate of the thermo reversible recording medium. The thermo reversible recording label may have an adhesive layer of sticker layer formed (no-releasing paper type) or may have a releasing paper attached under the adhesive layer of sticker layer (releasing paper type). A hot melt type material is usually used as the material for forming the adhesive layer.

The adhesive layer or the sticker layer may be formed using known materials. Examples of such materials include, but not limited to, urea resins, melamine resins, phenol resins, epoxy resin, vinyl acetate-based resins, vinyl acetate-acryl-based copolymers, ethylene-vinyl acetate copolymers, acrylic resins, polyvinyl ether-based resins, vinyl chloride-vinyl acetate-based copolymers, polystyrene-based resins, polyester-based resins, polyurethane-based resins, polyamide-based resins, chlorinated polyolefin-based resins, polyvinyl butyral-based resins, acrylate-based copolymers, methacrylate-based copolymers, natural cubber, cyanoacrylate-based resins, silicon-based resins and the like.

Then, a member having a memory and a reversible display part in which at least the above-mentioned thermo sensible layer constituting a thermo reversible recording medium is used as this reversible display part will be described.

The examples of such a member having the memory and the reversible display part are as follows.

(1) Members in which part of a member that holds the memory is used as a substrate for directly forming the thermo reversible recording medium.

(2) Members in which the surface of the thermo reversible recording medium is adhered to a substrate separately formed with respect to a member that holds the memory.

(3) Members in which the thermo reversible recording label is adhered, via an adhesive layer or sticker layer, to a member that holds the memory.

(4) Members in which the memory is provided in the thermo reversible recording medium (in this case, the substrate of the thermo reversible recording medium should preferably be thick).

In any case, it is necessary that the memory and the reversible display part are so set that functions thereof can be manifested, respectively. The memory may be provided on the opposite surface to a surface of the substrate of the thermo reversible recording medium on which the thermo sensible layer is provided, or the memory may be provided between the substrate and the thermo sensible layer, or on a portion of the thermo sensible layer.

The member that holds the memory is not particular restricted. Examples of such a member are cards, disks, disk cartridges and tape cassettes.

The following examples are listed.

Thick cards such as IC cards (contact type and non-contact type), optical cards and the like, disk cartridges containing a disk which can re-write recorded information such as a floppy disk, optical magnetic recording disk (MD), DVD-RAM and the like, re-writable disks using no disk cartridge such as CR-RW, DVD-RW and the like, write one type disks such as CD-R and the like, video tape cassettes, and the like.

This member having both of a reversible display part and the memory is illustrated below using a card having such a structure. By displaying part of information recorded in the information memorizing part on a thermo sensible layer, the owner of the card can recognize the information only by looking at the card without a specific apparatus, namely, the availability thereof increases extremely as compared with cards using no thermo reversible recording medium.

The memory is not particularly restricted provided it can record necessary information. Examples of such a memory are magnetic recording layers, contact type IC, non-contact type IC, and optical memories.

The magnetic recording layer is formed by applying metal compounds such as iron oxide, barium ferrite and the like usually used or resins such as vinyl-chloride-based resins, urethane-based resins and nylon-based resins on a substrate, or according to methods such as vapor deposition, sputtering and the like using the above-mentioned metal compound without using a resin.

Further, in thermo reversible recording media used for display, the thermo sensible layer can also be used as a recording part utilizing bar cord, two dimensional code and the like.

An example of a material using the above-mentioned thermo reversible recording label (3), in the case of a thick substrate on which application of the thermo sensible layer is difficult. In this case, the adhesive layer or sticker layer can be provided on the whole or a portion of this material. By this, the medium becomes convenient because a portion of information recorded on a magnetic medium can be displayed.

This thermo reversible recording label having an adhesive layer or sticker layer provided can be applied not only to the above-mentioned magnetic vinyl chloride cards, but also to thick cards such as IC cards, optical cards and the like.

Further, this thermo reversible recording label can be used instead of a display label on a disk cartridge containing a disk which can re-write recorded information, such as a floppy disk, MD, DVD-RAM and the like.

Figure 3:
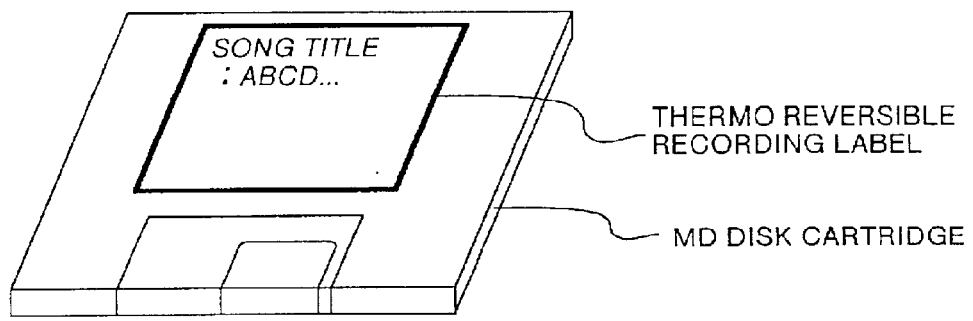
FIG. 3 is a view showing an example in which the thermo reversible recording label is pasted on a cartridge of an MD disk.

FIG. 3 shows an example in which the thermo reversible recording label is pasted on MD disk cartridge.

Further, in the case of a disk using no cartridge, such as CR-RW and the like, it is also possible to paste the thermo reversible recording label directly on a disk, and to provide a thermo sensible layer directly on a disk.

Thus, applications to uses such as automatic alteration of display contents corresponding to alteration of recorded contents, and the like, are possible.

Figure 4:
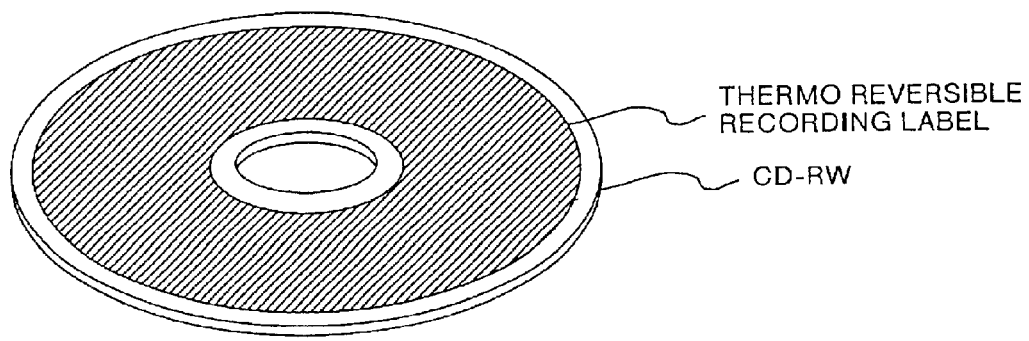
FIG. 4 is a view showing an example in which the thermo reversible recording label is pasted on CD-RW.

FIG. 4 shows an example in which the thermo reversible recording label is directly pasted on CD-RW.

In the thermo reversible recording label of the present invention, it is also possible that a thermo reversible recording medium is pasted on a once write type disk such as CD-R and the like and part of recorded information once-written in CD-R can also be re-written and displayer.

Figure 5:
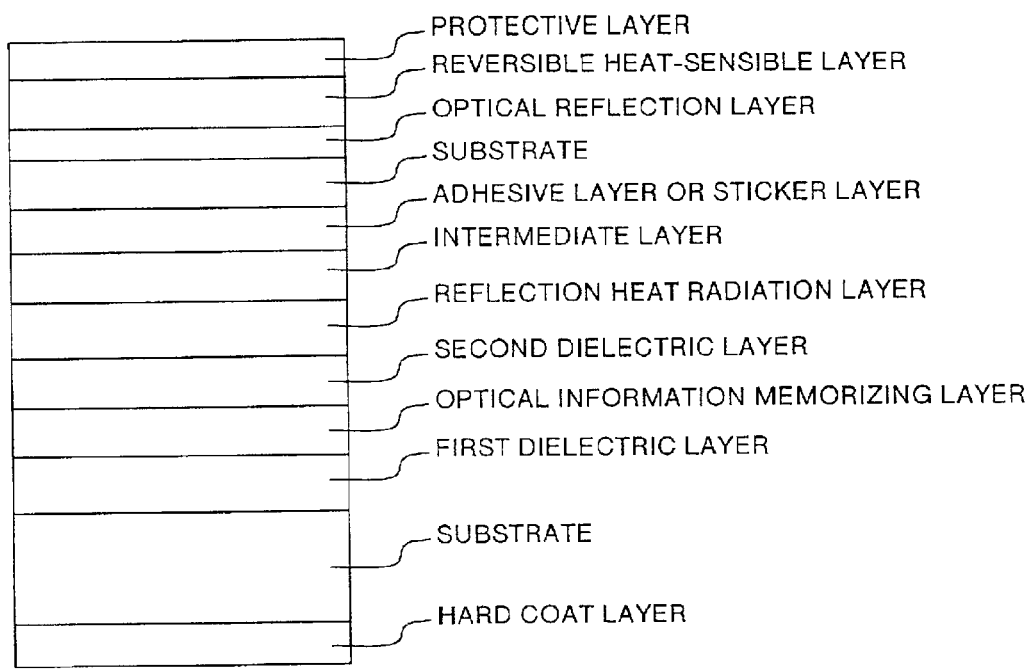
FIG. 5 is a view showing an example in which the thermo reversible recording label is formed on an optical information memorizing medium (CD-RW) using an AgInSbTe-based phase change-type recording material.

FIG. 5 is an example having a constitution in which a thermo reversible recording label is formed on an optical information memorizing medium (CD-RW) using AgInSbTe-based phase-variation type recording material. In a basic constitution, a first dielectric layer, optical information memorizing layer, second dielectric layer, reflection heat radiation layer and intermediate layer on a substrate having guide grooves, and a hard coat layer is provided on the rear surface of the substrate. Further, a thermo reversible recording label is pasted on the intermediate layer.

Though a dielectric layer is not necessarily required to be provided on both side of the recording layer, when the substrate is made of a material having low heat resistance such as a polycarbonate resin, it is desirable to provide a first dielectric layer.

Figure 6:
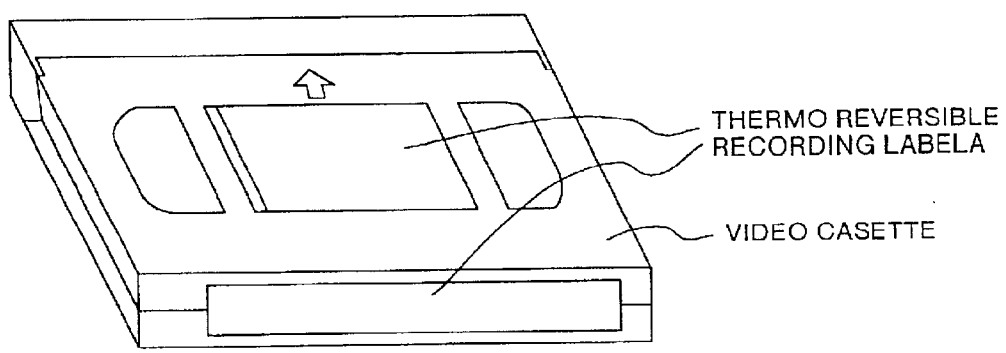
FIG. 6 is a view showing a display label of a video tape cassette.

Further, as shown in FIG. 6, it can also be used as a display label for a video tape cassette.

As the method of providing a thermo reversible recording function on a thick card, disk cartridge and disk, there are a method of directly applying a thermo sensible layer on them, a method in which a thermo sensible layer is previously formed on a separate substrate and the thermo sensible layer is transferred onto a thick card, disk cartridge and disk, and other methods, in addition to the above-mentioned method of pasting a thermo reversible recording label.

When transferring the thermo sensible layer onto the thick card, an adhesive layer and sticker layer of hot melt type and the like may also be provided on the thermo sensible layer.

When the thermo reversible recording label is pasted or the thermo sensible layer is provided on a rigid substrate such as a thick card, disk, disk cartridge, tape cassette and the like, it is preferable to provide a layer or sheet having elasticity and acting as cushion between the rigid substrate and a label or the thermo sensible layer, to obtain improved contact property with a thermal head, and to form an image uniformly.

Figure 7A:
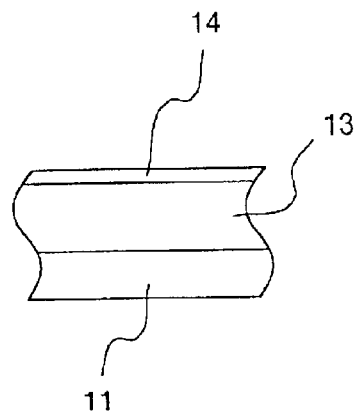
FIG. 7A to FIG. 7C are views for explaining an example of the layer constitution of the thermo reversible recording medium of the present invention.
Figure 7B:
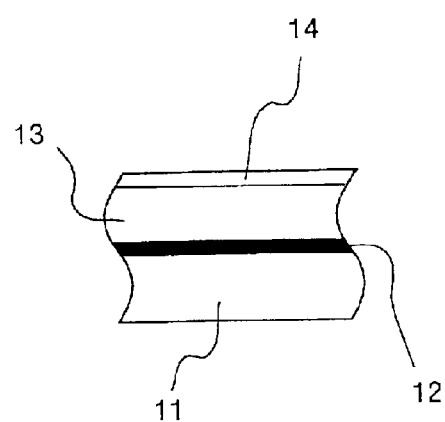
Figure 7C:
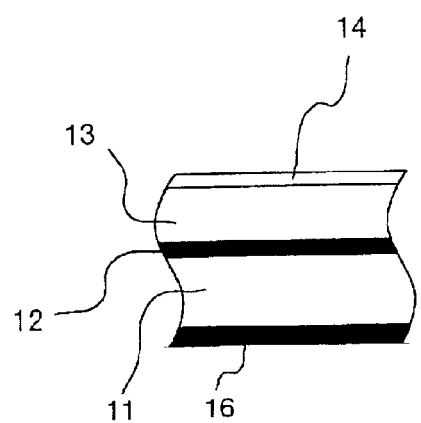
Figure 8:
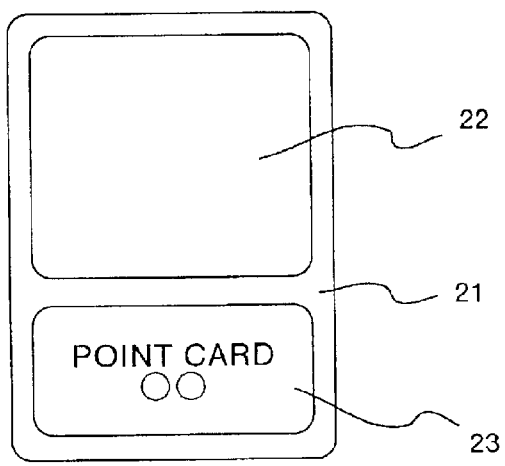
FIG. 8 is a view illustrating one example of the use of the thermo reversible recording medium of the present invention.
Figure 8:
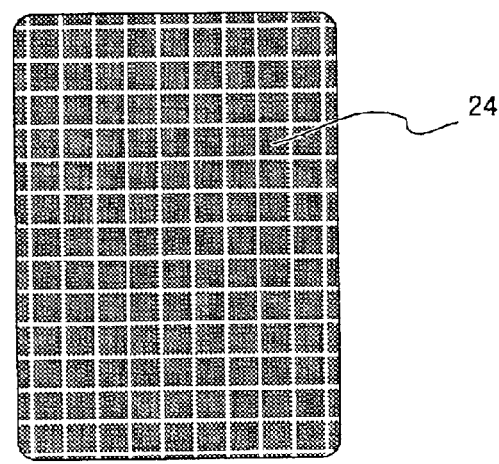

The reversible thermo sensible recording medium of the present invention can be processed into a film in the manner as shown in, for example, FIG. 7A to FIG. 7C. In FIG. 7A the reversible thermo sensible recording layer (13) and the protective layer (14) are provided on the substrate (11). In FIG. 7B, the aluminum reflection layer (12), the reversible thermo sensible recording layer (13) and the protective layer (14) are provided on the substrate (11). As shown in FIG. 7B, the aluminum reflection layer (12), the reversible thermo sensible recording layer (13) and the protective layer (14) are provided on the substrate (11) and the magnetic recording layer (16) is provided on the rear surface of the substrate (11) as shown in FIG. 7C. Such a film may be provided on the card (21) having a printed display part (23) as shown in FIG. 8.

Figure 9A:
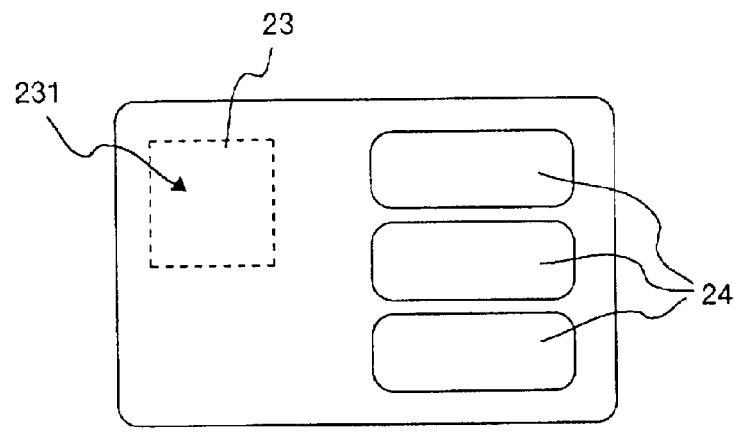
FIG. 9A and FIG. 9B are views illustrating another example of the use of the thermo reversible recording medium of the present invention.

Further, as shown in FIG. 9A for example, it is possible that a film having the aluminum reflection layer (12), the reversible thermo sensible recording layer (13) and the protective layer (14) provided on the substrate (11) (see FIG. 7B) is processed into a card, a concave part (23) is formed to accommodate an IC tip, and processing into a card is effected.

Figure 9B:
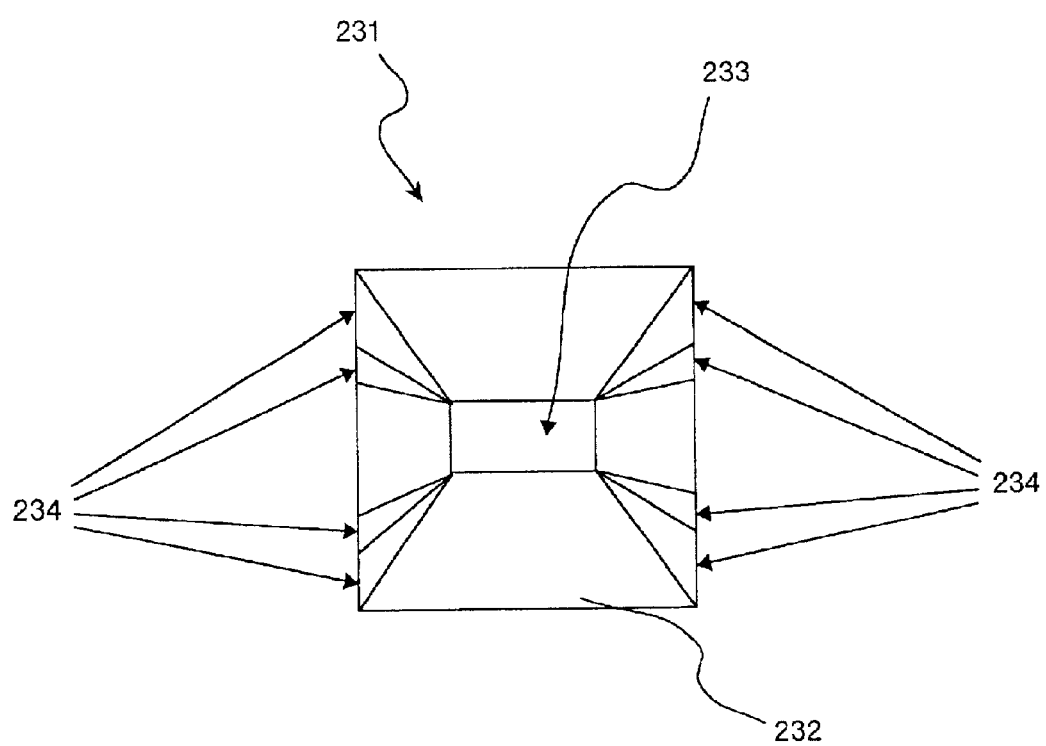

In this example, a re-writing recording part (24) is label-processed on a reversible thermo sensible recording medium in the form of the card, and the concave part for burying IC tip (23) is formed on a given position on the rear surface of the reversible thermo sensible recording medium, and in this concave part (23), a wafer (231) as shown in FIG. 9B is integrated and fixed.

In the wafer (231), an integrated circuit (233) is provided on the wafer substrate (232) and a plurality of contact terminals (234) connected electrically to this integrated circuit (233) are provided on the wafer substrate (232).

This contact terminal (234) is exposed to the rear side of the wafer substrate (232), and a dedicated printer (readerwriter) is in electrical contact with this contact terminal (234), to form a constitution so that reading and re-writing of given information are possible.

Figure 10A:
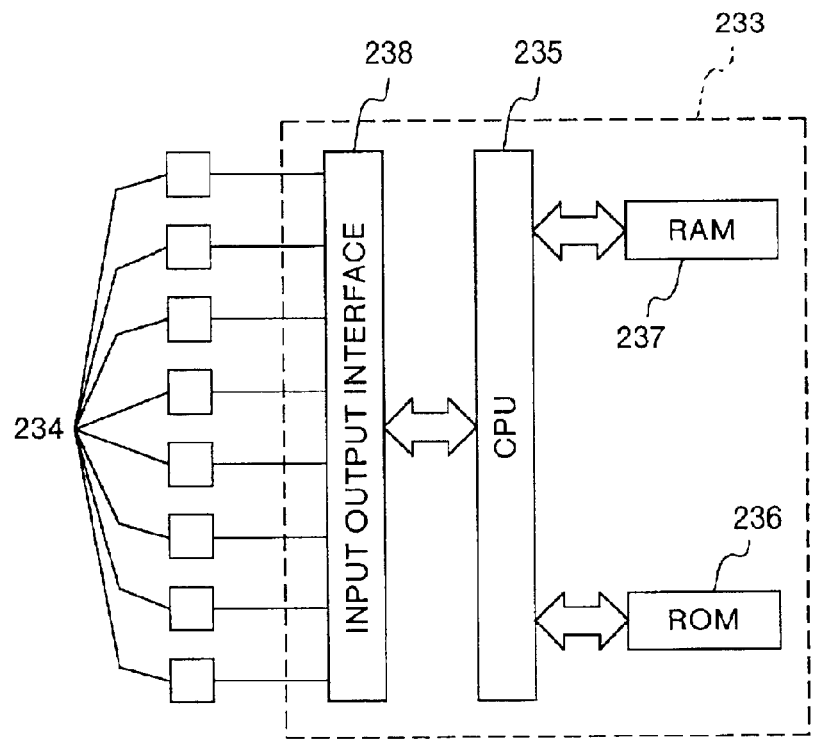
FIG. 10A and FIG. 10B are views illustrating still another example of the use of the thermo reversible recording medium of the present invention.
Figure 10B:
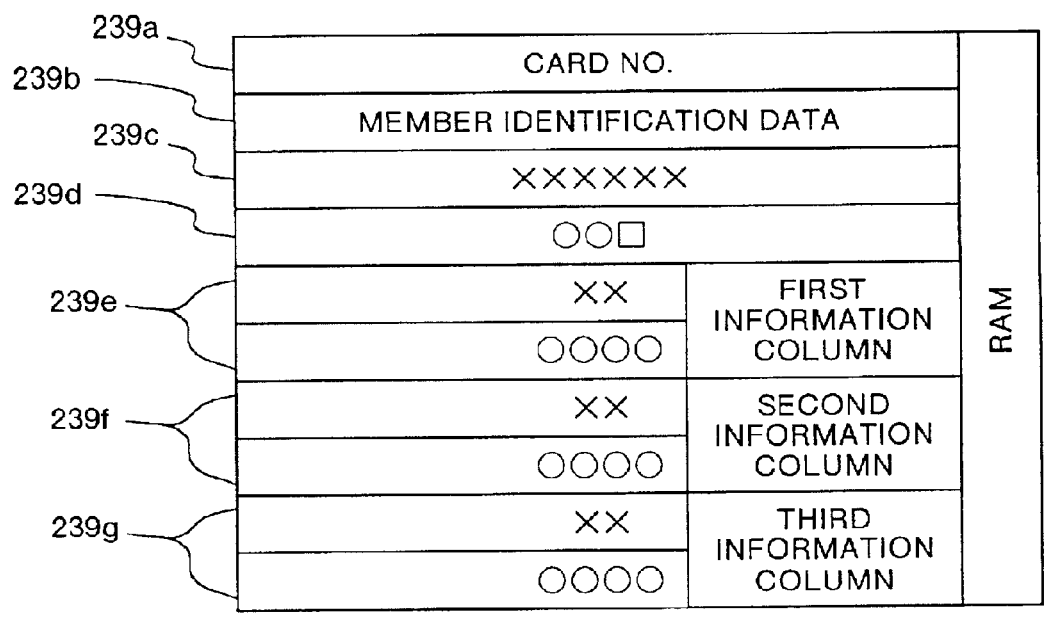

Examples of use of the reversible thermo sensible recording card are illustrated in FIG. 10A and FIG. 10B.

FIG. 10A is a schematic constitution block view showing the integrated circuit (233), and FIG. 10B is a constitution block view showing one example of recording data of RAM.

The integrated circuit (233) is constituted, for example, of LSI, and it contains the CPU (235) which can execute control motion in a given order, ROM (236) accommodating motion program data of the CPU (235), and the RAM (237) which can write and read necessary data.

Further, the integrated circuit (233) contains an input output interface (238) which receives an input signal and impart the input data to the CPU (235) and receives an output signal from the CPU (235) and outputs the signal, and though not shown, a power on reset circuit, a clock generating circuit, pulse dividing circuit (interrupt pulse generation circuit), and address decoder circuit.

The CPU (235) can execute motion of an interrupt control routine, corresponding to an interrupt pulse imparted periodically from the pulse division circuit.

Further, the address decoder circuit decodes address data from the CPU (235), and imparts signals to the ROM (236), RAM (237) and input output interface (238), respectively.

A plurality (8 in the figure) of contact terminals (234), are connected to the input output interface. Data from the above-mentioned dedicated printer (readerwriter) is input from this contact terminal (234) via the input output interface (238) into the CPU (235). The CPU (235) responds to the input signal and conducts each function according to program data accommodated in the ROM (236), and outputs given data and signals to the card readerwriter via the input output interface (238).

As shown in FIG. 10B, the RAM (237) contains a plurality of memory regions (239a) to (239f).

For example, card numbers are memorized in the region (239a), and personal data such as the name, address, telephone number and the like of the card owner is, for example, memorized in the region (239b), and information corresponding to remaining valuable value or valuable paper which can be used by the owner is, for example, memorized in the region (239c), and information corresponding to remaining valuable value or valuable paper used by the owner is memorized in the regions (239d), (239e), (239f) and (239g).

The present invention further provides an image processing method of conducting formation and/or deletion of an image by heating using the above-mentioned thermo reversible recording medium, the above-mentioned member having the memory, or the above-mentioned label. This invention also provides an image processing apparatus for conducting formation and/or deletion of an image by heating, having the above-mentioned thermo reversible recording medium, the above-mentioned member having an information memorizing part, or the above-mentioned label.

For formation of images, an image recording unit is used which can heat the medium in the form of an image. This image recording unit may be a thermal head, laser and the like.

For deletion of image, a hot stamp, ceramic heater, heat roller, hot air and the like and an image deletion unit such as a thermal head, laser and the like are used.

Among them, a ceramic heater is preferably used. When the ceramic heater is used, the overall size of the apparatus can be mad smaller, and stable deletion condition can be obtained, leading to an image having excellent contrast.

The temperature set in the ceramic heater should preferably be 100° C. or more, further preferably 110° C. or more, and particularly more preferably 115° C. or more.

Further, when the thermal head is used as the image deletion unit, the overall size of the apparatus can be further made smaller.

Furthermore, consumption electric powder can be reduced, and a handy type apparatus of battery drive can also be used.

If one thermal head is commonly used for formation and deletion of image, the overall size can still be further reduced.

When formation and deletion are conducted by one thermal head, it may be permissible that all of the previous images are deleted once, and new images are formed renewedly, and an over write mode is also possible in which previous images are once deleted and new images are formed while changing energy for each image.

In the over write mode, the total time including formation and deletion is shortened, leading to speed up of recording.

If the card has the thermo sensible layer and the memory, then the apparatus also includes means for reading and re-writing information in the memory.

Figure 11:
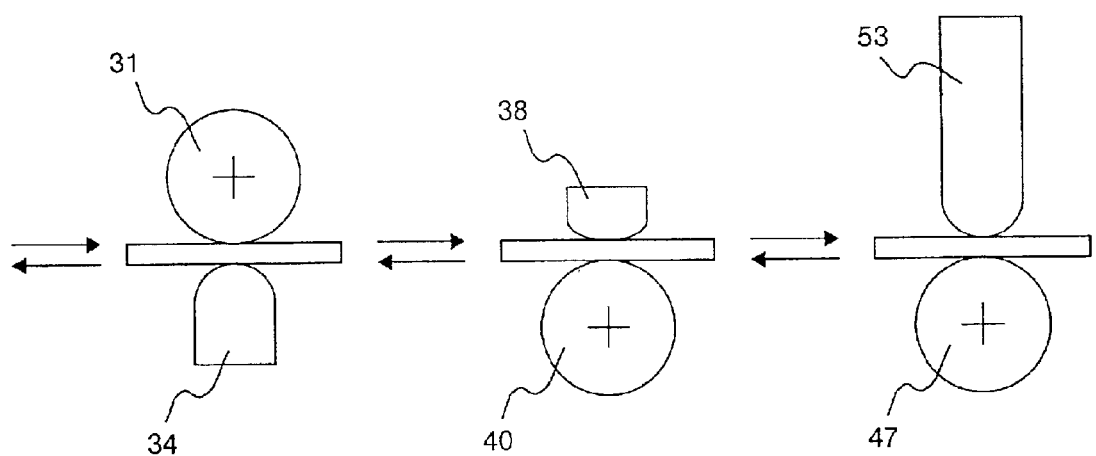
FIG. 11 is a view illustrating one example of a thermo reversible recording apparatus of the present invention.

FIG. 11 shows an example of the image processing apparatus of the present invention. In this apparatus, image deletion is conducted by a ceramic heat and image formation is conducted by a thermal head.

First, information memorized in a magnetic recording layer of a recording medium is read by a magnetic head, then, images recording in a reversible thermo sensible layer are deleted by heating by a ceramic heater, further, a new information treated based on the information read by the magnetic head is recorded by a thermal head in a reverse thermo sensible layer. Then, the information in the magnetic recording layer is also re-written by new information.

Namely, in the image processing apparatus of FIG. 11, a thermo reversible recording medium (1) having a magnetic recording layer provided on the opposite side of a thermo sensible layer is transported along a transporting path shown by arrows, or transported to the reverse direction in an apparatus along the transporting path.

In the thermo reversible recording medium (1), magnetic recording or record deletion is effected on a magnetic recording layer between a magnetic head (34) and the transportation roller (31), and heated for deleting images between a ceramic heater (38) and a transportation roller (40), and images are formed between the thermal head (53) and the transportation roller (47), then, transported out of the apparatus.

Re-writing of magnetic recording may be preformed before or after deletion of images by the ceramic heater.

Further, if desired, after passing between the ceramic heater (38) and the transportation roller (40), or after passing between the thermal head (53) and the transportation roller (47), the medium is transported to reverse direction along the transportation path, and thermal treatment can be effected again by the ceramic heater (38) and printing treatment can be performed again by the thermal head (53).

EXAMPLE 1

Al layer of thickness about 400 Ångstroms was vacuum vapor-deposited on the PET film side of an original drapery manufactured by Dainippon Ink & Chemicals, Ink. (Memory Dick, DS-1711-1040: a magnetic recording layer and a self cleaning layer have been applied on a transparent PET film having a thickness of 188 $\mu$m), to form an optical reflection layer.

On this was applied a solution composed of

| | |
|---|---|
| Vinyl chloride-vinyl acetate-phosphate copolymer (manufactured by Denki Kagaku Kogyo K.K., Denka Vinyl #1000P) | 10 parts |
| Methyl ethyl ketone | 45 parts |
| Toluene | 45 parts | and the solution was dried by heating to provide an adhesion layer having a thickness of about 0.5 $\mu$m.

Then, into a resin dissolved solution prepared by dissolving 26 parts of a vinyl chloride-based copolymer (manufactured by Nippon Xeon Co., Ltd., MR110) into 230 parts of methyl ethyl ketone was added

| | |
|---|---|
| Behenyl behenate (test sample manufactured by Miyshi Yushi Kabushiki Kaisha) | 6 parts |
| $CH_3(CH_2)_{17}NHCOCONH(CH_2)_{17}CH_3$ (test sample manufactured by Miyshi Yushi Kabushiki Kaisha) | 4 parts, | ceramic beads having a diameter of 2 mm were placed in a glass bottle, and using a paint shaker (manufactured by Asada Tekko K.K.), and the mixture was dispersed for 48 hours to prepare a uniform dispersion.

Into this dispersion, 4 parts of an isocyanate compound (manufactured by Nippon Polyurethane K.K., Coronate 2298-90T) was added to prepare a thermo sensible layer solution, and applied on an adhesive layer of a PET film having the above-mentioned magnetic recording layer, and dried by heating, then, the applied solution was further kept at 60° C. for 72 hours to cross-link the resin to provide a thermo sensible layer having a thickness of about 10 $\mu$m.

On this thermo sensible layer was applied a solution composed of

| | |
|---|---|
| 75% Solution of urethane acrylate-based ultraviolet ray-curing resin in butyl acetate (manufactured by Dainippon Ink & Chemicals, Ink, Unidick C7-157) | 10 parts |
| Isopropyl alcohol | 10 parts, | the solution was dried by heating, then, irradiated with ultraviolet ray using a high pressure mercury lamp of 80 w/cm to cure the solution to form a protective layer having a thickness of about 3 $\mu$m, giving a thermo reversible recording medium.

EXAMPLE 2

A thermo reversible recording medium was produced in the same manner as in Example 1 except that the amount of behenyl behenate was changed to 8 parts and the amount of $CH_3(CH_2)_{17}NHCOCONH(CH_2)_{17}CH_3$ was changed to 2 parts.

EXAMPLE 3

A thermo reversible recording medium was produced in the same manner as in Example 1 except that the amount of behenyl behenate was changed to 9 parts and the amount of $CH_3(CH_2)_{17}NHCOCONH(CH_2)_{17}CH_3$ was changed to 1 part.

EXAMPLE 4

A thermo reversible recording medium was produced in the same manner as in Example 1 except that the amount of behenyl behenate was changed to 9.5 parts and the amount of $CH_3(CH_2)_{17}NHCOCONH(CH_2)_{17}CH_3$ was changed to 0.5 parts.

EXAMPLE 5

A thermo reversible recording medium was produced in the same manner as in Example 2 except that behenyl behenate was replaced by diheptadecylketone (manufactured by Nippon Kasei Chemical Co., Ltd., Wax Kans.).

EXAMPLE 6

A thermo reversible recording medium was produced in the same manner as in Example 2 except that behenyl behenate was replaced by ethanolamine distearate (manufactured by Nippon Kasei Chemical Co., Ltd., Suliaid S).

EXAMPLE 7

A thermo reversible recording medium was produced in the same manner as in Example 4 except that $CH_3(CH_2)_{17}NHCOCONH(CH_2)_{17}CH_3$ was replaced by $CH_3(CH_2)_{16}CONHNHCO(CH_2)_{16}CH_3$ (test sample manufactured by Miyshi Yushi Kabushiki Kaisha).

EXAMPLE 8

A thermo reversible recording medium was produced in the same manner as in Example 7 except that behenyl behenate was replaced by diheptadecylketone (manufactured by Nippon Kasei Chemical Co., Ltd., Wax Kans.).

EXAMPLE 9

A thermo reversible recording medium was produced in the same manner as in Example 7 except that behenyl behenate was replaced by ethanolamine distearate (manufactured by Nippon Kasei Chemical Co., Ltd., Suliaid S).

EXAMPLE 10

A thermo reversible recording medium was produced in the same manner as in Example 4 except that $CH_3(CH_2)_{17}NHCOCONH(CH_2)_{17}CH_3$ was replaced by $CH_3(CH_2)_{17}OOCNH(CH_2)_6NHCOO(CH_2)_{17}CH_3$. (test sample manufactured by Miyshi Yushi Kabushiki Kaisha).

EXAMPLE 11

A thermo reversible recording medium was produced in the same manner as in Example 2 except that $CH_3(CH_2)_{17}NHCOCONH(CH_2)_{17}CH_3$ was replaced by $CH_3(CH_2)_{17}NHCOO(CH_2)_4OOCNH(CH_2)_{17}CH_3$ (test sample manufactured by Miyshi Yushi Kabushiki Kaisha).

EXAMPLE 12

A thermo reversible recording medium was produced in the same manner as in Example 4 except that $CH_3(CH_2)_{17}NHCOCONH(CH_2)_{17}CH_3$ was replaced by $CH_3(CH_2)_{17}SO_2(CH_2)_2SO_2(CH_2)_{17}CH_3$ (test sample manufactured by Miyshi Yushi Kabushiki Kaisha).

EXAMPLE 13

A thermo reversible recording medium was produced in the same manner as in Example 2 except that $CH_3(CH_2)_{17}NHCOCONH(CH_2)_{17}CH_3$ was replaced by the following material (test sample manufactured by Miyshi Yushi Kabushiki Kaisha).

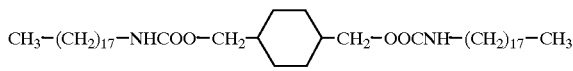

EXAMPLE 14

An adhesive layer, thermo sensible layer and protective layer were formed on the Al vapor-deposited surface of an Al deposited polyester film (manufactured by Toray Industries, Inc., #50 Mtalmy) having a thickness of about 50 μm in the same manner as in Example 1.

Further, an acrylic sticker layer having a thickness of about 5 μm was provided on the rear surface of the thermo sensible layer of the substrate, to produce a thermo reversible recording label.

This label was made into a donut as shown in FIG. 4, and pasted on CD-RW as shown in FIG. 5, to produce an optical information memorizing medium equipped with a reversible display function.

Using the optical information memorizing medium as produced above, part of information (date, time and the like) memorized by a CD-RW drive (manufactured by Ricoh Co., Ltd., MP6200S) was displayed and recorded on the thermo sensible layer using a recording apparatus having a recording unit (thermal head) and a deleting means (ceramic heater) while controlling recording energy of the thermal head corresponding to change in recording temperature of each medium.

Further, information of the memorizing layer of the optical information memorizing medium was re-written using this drive, the previous record was deleted using the deleting unit, and the re-written information was re-written newly on the thermo sensible layer using the thermal head, to effect display recording.

Further, re-writing of this display recording was repeated 100 times, however, recording and deletion were possible.

EXAMPLE 15

The thermo reversible recording label in Example 14 was pasted on MD disk cartridge as shown in FIG. 3.

Part of information (date, song title and the like) memorized by MD was displayed and recorded on the thermo sensible layer using a recording apparatus having the recording unit (thermal head) and the erasing unit (ceramic heater) while controlling recording energy of the thermal head corresponding to change in recording temperature of each medium.

Further, re-writing of this display recording was repeated 100 times, however, recording and deletion were possible.

COMPARATIVE EXAMPLE 1

A thermo reversible recording medium was produced in the same manner as in Example 1 except that the application solution of the thermo sensible layer was changed as follows.

| | |
|---|---|
| Behenic acid (reagent manufactured by SIGMA, purity 99%) | 5 parts |
| Eicosandioic acid (manufactured by Okamura Seiyu K.K., SL-20-90) | 5 parts |
| Vinyl chloride-vinyl acetate copolymer (manufactured by Union Carbide, VYHH) | 38 parts |
| Tetrahydrofuran | 210 parts |
| Toluene | 20 parts |

COMPARATIVE EXAMPLE 2

A thermo reversible recording medium was produced in the same manner as in Example 1 except that the application solution of the thermo sensible layer was changed as follows.

The thermo sensible layer herein formed had poor uniformity showing remarkable white particles.

| | |
|---|---|
| Behenyl behenate (reagent manufactured by SIGMA) | 9.5 parts |
| Ethylenebisbehenic amide (manufactured by Nippon Kasei Chemical Co., Ltd., Sulipax B) | 0.5 parts |
| Vinyl chloride-vinyl acetate copolymer (manufactured by Union Carbide, VYHH) | 30 parts |
| Tetrahydrofuran | 160 parts |

EXAMPLE 16

A thermo reversible recording medium was produced in the same manner as in Example 1 except that the amount of behenyl behenate was changed to 7 parts and $CH_3(CH_2)_{17}NHCOCONH(CH_2)_{17}CH_3$ was replaced by 3 parts by weight of the following compound.

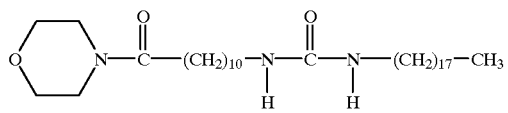

EXAMPLE 17

A thermo reversible recording medium was produced in the same manner as in Example 1 except that the amount of behenyl behenate was changed to 7 parts and $CH_3(CH_2)_{17}NHCOCONH(CH_2)_{17}CH_3$ was replaced by 3 parts by weight of the following compound.

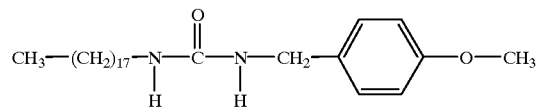

EXAMPLE 18

A thermo reversible recording medium was produced in the same manner as in Example 1 except that the amount of behenyl behenate was changed to 7 parts and $CH_3(CH_2)_{17}NHCOCONH(CH_2)_{17}CH_3$ was replaced by 3 parts by weight of the following compound.

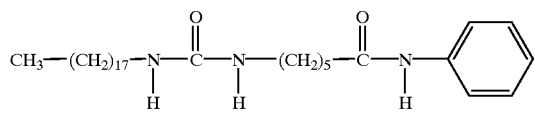

EXAMPLE 19

A thermo reversible recording medium was produced in the same manner as in Example 1 except that the amount of behenyl behenate was changed to 7 parts and $CH_3(CH_2)_{17}NHCOCONH(CH_2)_{17}CH_3$ was replaced by 3 parts by weight of the following compound.

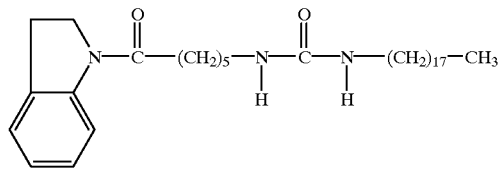

EXAMPLE 20

A thermo reversible recording medium was produced in the same manner as in Example 1 except that the amount of behenyl behenate was changed to 7 parts and $CH_3(CH_2)_{17}NHCOCONH(CH_2)_{17}CH_3$ was replaced by 3 parts by weight of the following compound.

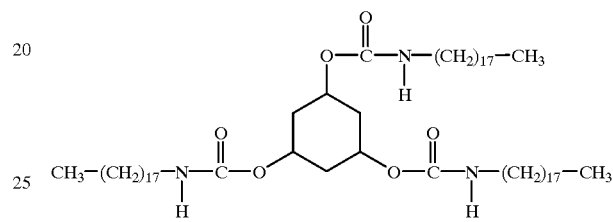

EXAMPLE 21

A thermo reversible recording medium was produced in the same manner as in Example 1 except that the amount of behenyl behenate was changed to 7 parts and $CH_3(CH_2)_{17}NHCOCONH(CH_2)_{17}CH_3$ was replaced by 3 parts by weight of the following compound.

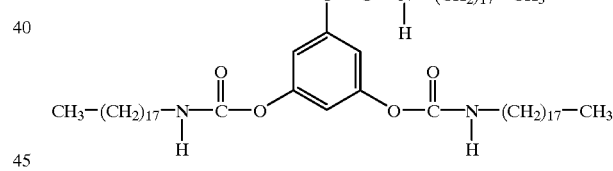

EXAMPLE 22

A thermo reversible recording medium was produced in the same manner as in Example 16 except that behenyl behenate was replaced by ethanolamine distearate (manufactured by Nippon Kasei Chemical Co., Ltd., Suliaid S).

EXAMPLE 23

A thermo reversible recording medium was produced in the same manner as in Example 16 except that behenyl behenate was replaced by diheptadecylketone (manufactured by Nippon Kasei Chemical Co., Ltd., Wax Kans.).

EXAMPLE 24

A thermo reversible recording medium was produced in the same manner as in Example 1 except that the amount of behenyl behenate was changed to 9 parts and $CH_3(CH_2)_{17}NHCOCONH(CH_2)_{17}CH_3$ was replaced by each 0.5 parts of the following two compounds.

$CH_3CH_2O(CH_2)_3NHCO(CH_2)_{11}NHCONH(CH_2)_{17}CH_3$

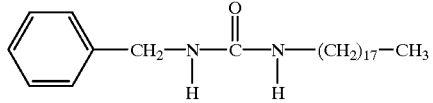

Evaluation

The following evaluations were conducted using thus produced thermo reversible recording media (Examples 1 to 13, 16 to 24, Comparative Examples 1 and 2).

(1) Contrast

The medium obtained as described above was made transparent previously, and was heated using a magnetic card readerwriter having print deleting function (KU-R-3001FA) manufacture by Kyushu Matsushita Electric Co., Ltd., while setting the printing energy value of a thermal heat to 0.47 mJ/dot, the medium was cooled to room temperature, and the reflection density ("initial image density") was measured using a Macbeth reflection densitometer.

Then, opaque images were formed on the medium using the same apparatus at the above-mentioned energy value, thermal printing was conducted while wetting the deletion temperature value of a ceramic heater to 90° C., the medium was cooled to room temperature, and the reflection density ("initial deletion density") was measured using the Macbeth reflection densitometer.

Next, the initial contrast was calculated as initial deletion concentration—initial image concentration.

(2) Ammonia Resistance

A previously transparent made medium was immersed in a 8% ammonia aqueous solution for 48 hours, then, the initial image density and initial deletion density was measured using the same apparatus according to the same method as used in the above-mentioned contrast measurement, and these were called the image density and the deletion density after the test.

The contrast after test was calculated (as deletion density after the test—image density after the test).

(3) Deleting Property

The medium was previously made transparent, and partially opacified using a readerwriter (KU-R-3001FA) manufacture by Kyushu Matsushita Electric Co., Ltd., under 5° C. by a thermal inclination tester, then, deletion was effected at the optimum deletion temperature around the center of the deletion temperature. This procedure was conducted on 50 pieces of paper, and deleted condition of images was visually confirmed and evaluated.

Evaluation Level:

○: all can be deleted

○ to Δ: pale deletion residue occurs slightly Δ: pale deletion residue occurs sometimes x: pale deletion residue often occurs The results of (1) to (3) are summarized in Table 1.

(4) Transparent-state upper limit temperature ($T_{WX}$), opaque-state lower limit temperature ($T_{VO}$), temperature difference ($\Delta T_{WV}$) between transparent-state upper limit temperature and opaque-state lower limit temperature, transparent-state lower limit temperature ($T_{WO}$), and transparent-state temperature range ($\Delta T_Z$)

$T_{WX}$, $T_{VO}$, $\Delta T_{WV}$, $T_{WO}$, $\Delta T_Z$ were measured using the above-mentioned measuring methods. The results are summarized in Tables 3 and 4.

TABLE 1

| | Initial | | | Ammonia resistance test | | | |
|---|---|---|---|---|---|---|---|
| | Image density | Deletion density | Contrast | Image density | Deletion density | Contrast | Deleting property |
| Example 1 | 0.22 | 1.24 | 1.02 | 0.23 | 1.25 | 1.02 | ○ |
| Example 2 | 0.20 | 1.20 | 1.00 | 0.22 | 1.23 | 1.01 | ○ |
| Example 3 | 0.19 | 1.14 | 0.95 | 0.23 | 1.15 | 0.92 | ○~Δ |
| Example 4 | 0.18 | 1.12 | 0.94 | 0.20 | 1.14 | 0.94 | Δ |
| Example 5 | 0.19 | 1.20 | 1.01 | 0.21 | 1.25 | 1.04 | ○ |
| Example 6 | 0.18 | 1.18 | 1.00 | 0.21 | 1.23 | 1.02 | ○ |
| Example 7 | 0.18 | 1.17 | 0.99 | 0.19 | 1.20 | 1.01 | ○ |
| Example 8 | 0.19 | 1.16 | 0.97 | 0.22 | 1.19 | 0.97 | ○ |
| Example 9 | 0.20 | 1.18 | 0.98 | 0.23 | 1.24 | 1.01 | ○ |
| Example 10 | 0.18 | 1.17 | 0.99 | 0.20 | 1.22 | 1.02 | ○ |
| Example 11 | 0.19 | 1.22 | 1.03 | 0.20 | 1.25 | 1.05 | ○ |
| Example 12 | 0.18 | 1.20 | 1.02 | 0.21 | 1.22 | 1.01 | ○ |
| Example 13 | 0.22 | 1.24 | 1.02 | 0.25 | 1.26 | 1.01 | Δ |
| Comparative Example 1 | 0.24 | 1.10 | 0.86 | 1.08 | 1.11 | 0.03 | Δ |
| Comparative Example 2 | 0.30 | 0.98 | 0.68 | 0.34 | 1.00 | 0.66 | X |

TABLE 2

| | Initial | | | Ammonia resistance test | | | |
|---|---|---|---|---|---|---|---|
| | Image density | Deletion density | Contrast | Image density | Deletion density | Contrast | Deleting property |
| Example 16 | 0.18 | 1.19 | 1.01 | 0.20 | 1.20 | 1.00 | ○ |
| Example 17 | 0.18 | 1.20 | 1.02 | 0.20 | 1.21 | 1.01 | ○ |
| Example 18 | 0.22 | 1.15 | 0.93 | 0.24 | 1.16 | 0.92 | ○ |
| Example 19 | 0.21 | 1.14 | 0.93 | 0.24 | 1.15 | 0.91 | ○ |
| Example 20 | 0.18 | 1.22 | 1.04 | 0.21 | 1.23 | 1.02 | ○ |
| Example 21 | 0.23 | 1.25 | 1.02 | 0.25 | 1.26 | 1.01 | ○ |
| Example 22 | 0.23 | 1.23 | 1.00 | 0.25 | 1.25 | 1.00 | ○ |
| Example 23 | 0.22 | 1.22 | 1.00 | 0.24 | 1.23 | 0.99 | ○ |
| Example 24 | 0.18 | 1.25 | 1.07 | 0.21 | 1.27 | 1.06 | ○ |

TABLE 3

|  | Transparent-state upper limit temperature ($T_{WX}$) | Opaque-state lower limit temperature ($T_{VO}$) | Temperature difference ($T_{WV}$) | Transparent-state lower limit temperature ($T_{WO}$) | Transparent-state temperature range ($\Delta T_Z$) |
|---|---|---|---|---|---|
| Example 1 | 125 | 136 | 11 | 78 | 47 |
| Example 2 | 120 | 127 | 7 | 76 | 44 |
| Example 3 | 116 | 133 | 7 | 76 | 30 |
| Example 4 | 110 | 116 | 6 | 75 | 25 |
| Example 5 | 121 | 128 | 7 | 80 | 41 |
| Example 6 | 123 | 133 | 10 | 82 | 41 |
| Example 7 | 135 | 144 | 9 | 83 | 53 |
| Example 8 | 133 | 146 | 13 | 85 | 48 |
| Example 9 | 132 | 140 | 8 | 84 | 48 |
| Example 10 | 115 | 123 | 8 | 81 | 34 |
| Example 11 | 120 | 130 | 10 | 83 | 37 |
| Example 12 | 140 | 148 | 8 | 85 | 55 |
| Example 13 | 114 | 126 | 12 | 87 | 27 |
| Comparative Example 1 | 123 | 133 | 9 | 98 | 25 |
| Comparative Example 2 | 104 | 125 | 21 | 81 | 23 |

TABLE 4

|  | Transparent-state upper limit temperature ($T_{WX}$) | Opaque-state lower limit temperature ($T_{VO}$) | Temperature difference ($T_{WV}$) | Transparent-state lower limit temperature ($T_{WO}$) | Transparent-state temperature range ($\Delta T_Z$) |
|---|---|---|---|---|---|
| Example 16 | 121 | 127 | 6 | 80 | 41 |
| Example 17 | 122 | 130 | 8 | 77 | 45 |
| Example 18 | 125 | 132 | 7 | 79 | 46 |
| Example 19 | 134 | 140 | 6 | 78 | 56 |
| Example 20 | 115 | 119 | 4 | 78 | 38 |
| Example 21 | 123 | 130 | 7 | 79 | 45 |
| Example 22 | 116 | 123 | 7 | 83 | 33 |
| Example 23 | 118 | 124 | 6 | 82 | 36 |
| Example 24 | 128 | 136 | 8 | 80 | 48 |

According to the present invention, a thermo reversible recording medium which can give sufficient degree of opacification even if preserved in the presence of a basic substance, has wider transparent-state temperature range, can provide an image having sufficient image deleting property and high contrast even if the environment temperature changes, and can provide sufficient degree of opacification, a member having a memory, an image processing method, and image processing apparatus are provided. Thus, this invention has considerably contributed to the field of the thermo reversible recording.

The present document incorporates by reference the entire contents of Japanese priority documents, 2000-176727 filed in Japan on Jun. 13, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A thermo reversible recording medium comprising:
   a substrate; and
   a thermo sensible layer, on said substrate, made mainly from resin and organic lower molecular weight substance, said thermo sensible layer reversibly achieving transparent-state and opaque-state depending on temperature,
   wherein the organic lower molecular weight substance is a linear hydrocarbon-containing compound having no carboxyl group (A) and selected from
   (1) linear hydrocarbon-containing compounds having a urethane bond,
   (2) linear hydrocarbon-containing compounds having a sulfonyl bond,
   (3) linear hydrocarbon-containing compounds having an oxalic diamide bond,
   (4) linear hydrocarbon-containing compounds having a diacylhydrazide bond,
   (5) linear hydrocarbon-containing aliphatic compounds having a urea bond and urethane bond,
   (6) linear hydrocarbon-containing aliphatic compounds having a urea bond and amide bond,
   (7) linear hydrocarbon-containing aliphatic compounds having a plurality of urea bonds, (8) linear hydrocarbon-containing cyclic compounds having a urea bond, or (9) linear hydrocarbon-containing cyclic compounds having an amide bond.

2. The thermo reversible recording medium according to claim 1 wherein (1), (2), (3), (4), (8) and (9) among linear hydrocarbon-containing compounds (A) have at least one of a phenylene group, cyclohexylene group, cyclohexyl group, phenyl group, and heterocyclic ring.

3. The thermo reversible recording medium according to claim 1 wherein at least one end of the molecule of the linear hydrocarbon-containing compound (A) is a methyl group.

4. The thermo reversible recording medium according to claim 1 wherein the linear hydrocarbon-containing compound (A) has a melting point of 100° C. or more.

5. The thermo reversible recording medium according to claim 1 wherein at least one of linear hydrocarbon-containing compounds (B) having a melting point lower than the melting point of said linear hydrocarbon-containing compound (A) by 20° C. or more and having no carboxyl group is further used as the organic lower molecular weight substance.

6. The thermo reversible recording medium according claim 5 wherein the total carbon number of linear hydrocarbons of the linear hydrocarbon-containing compound (A) and the linear hydrocarbon-containing compound (B) is from 6 to 60.

7. The thermo reversible recording medium according to claim 5 wherein the linear hydrocarbon-containing compound (B) has a melting point of 50° C. or more and less than 100° C.

8. The thermo reversible recording medium according to claim 5 wherein the mixing ratio by weight of the linear hydrocarbon-containing compound (A) to the linear hydrocarbon-containing compound (B) is 80:20 to 1:99.

9. The thermo reversible recording medium according to claim 5 wherein the linear hydrocarbon-containing compound (B) is at least one selected from fatty esters, ketones having an alkyl group, dibasic acid esters, alcohol difatty esters, aliphatic monoamide compounds and aliphatic monourea compounds.

10. The thermo reversible recording medium according to claim 1 wherein a transparent-state upper limit temperature is 115° C. or more, the temperature difference between the transparent-state upper limit temperature and an opaque-state lower limit temperature is 20° C. or less, and the transparent-state temperature range is 30° C. or more.

11. The thermo reversible recording medium according to claim 1 wherein the resin has a gel proportion of 30% or more.

12. The thermo reversible recording medium according to claim 1 wherein at least part of the resin is cross-linked.

13. A thermo reversible recording label comprising:
a substrate;
an adhesive layer formed on one side of said substrate; and
a thermo reversible recording layer formed on the other side of said substrate, said thermo reversible recording layer including
a substrate; and
the thermo sensible layer, on said substrate, made mainly from resin and organic lower molecular weight substance, said thermo sensible layer reversibly achieving transparent-state and opaque-state depending on temperature,
wherein the organic lower molecular weight substance is a linear hydrocarbon-containing compound having no carboxyl group (A) and selected from (1) linear hydrocarbon-containing compounds having a urethane bond, (2) linear hydrocarbon-containing compounds having a sulfonyl bond, (3) linear hydrocarbon-containing compounds having an oxalic diamide bond, (4) linear hydrocarbon-containing compounds having a diacylhydrazide bond, (5) linear hydrocarbon-containing aliphatic compounds having a urea bond and urethane bond, (6) linear hydrocarbon-containing aliphatic compounds having a urea bond and amide bond, (7) linear hydrocarbon-containing aliphatic compounds having a plurality of urea bonds, (8) linear hydrocarbon-containing cyclic compounds having a urea bond, (9) linear hydrocarbon-containing cyclic compounds having an amide bond.

14. A member comprising:
a memory which stores information; and
a reversible display part which at least includes a thermo sensible layer,
wherein said thermo sensible layer is made mainly from resin and organic lower molecular weight substance, said thermo sensible layer reversibly achieving transparent-state and opaque-state depending on temperature,
wherein the organic lower molecular weight substance is a linear hydrocarbon-containing compound having no carboxyl group (A) and selected from (1) linear hydrocarbon-containing compounds having a urethane bond, (2) linear hydrocarbon-containing compounds having a sulfonyl bond, (3) linear hydrocarbon-containing compounds having an oxalic diamide bond, (4) linear hydrocarbon-containing compounds having a diacylhydrazide bond, (5) linear hydrocarbon-containing aliphatic compounds having a urea bond and urethane bond, (6) linear hydrocarbon-containing aliphatic compounds having a urea bond and amide bond, (7) linear hydrocarbon-containing aliphatic compounds having a plurality of urea bonds, (8) linear hydrocarbon-containing cyclic compounds having a urea bond, or (9) linear hydrocarbon-containing cyclic compounds having an amide bond.

15. The member according to claim 14 wherein said memory is supported in or held by a holding member, and said reversible display part is provided on said holding member.

16. The member according to claim 15 wherein said holding member is a card, disk, disk cartridge or tape cassette.

17. A method of processing an image having the step of forming an image on or erasing an image from a thermo sensible layer made mainly from resin and organic lower molecular weight substance, said thermo sensible layer reversibly achieving transparent-state and opaque-state depending on temperature,
wherein the organic lower molecular weight substance is a linear hydrocarbon-containing compound having no carboxyl group (A) and selected from (1) linear hydrocarbon-containing compounds having a urethane bond, (2) linear hydrocarbon-containing compounds having a sulfonyl bond, (3) linear hydrocarbon-containing compounds having an oxalic diamide bond, (4) linear hydrocarbon-containing compounds having a diacylhydrazide bond, (5) linear hydrocarbon-containing aliphatic compounds having a urea bond and urethane bond, (6) linear hydrocarbon-containing aliphatic compounds having a urea bond and amide bond, (7) linear hydrocarbon-containing aliphatic compounds having a plurality of urea bonds, (8) linear hydrocarbon-containing cyclic compounds having a urea bond, or (9) linear hydrocarbon-containing cyclic compounds having an amide bond.

18. The method according to claim 17 wherein the image is formed on said thermo sensible layer by using a thermal head.

19. The method according to claim 17 wherein the image on said thermo sensible layer is deleted by using a thermal head or a ceramic heater.

20. A member comprising:

a memory which stores information; and a holding member which holds the memory, wherein a thermo reversing recording label is stuck on one surface of said holding member, said thermo reversible recording label including a substrate;

an adhesive layer formed on one side of said substrate for sticking said thermo reversible recording label to said holding member; and a thermo sensible layer, on the other side of said substrate, made mainly from resin and organic lower molecular weight substance, said thermo sensible layer reversibly achieving transparent-state and opaque-state depending on temperature, wherein the organic lower molecular weight substance is a linear hydrocarbon-containing compound having no carboxyl group (A) and selected from (1) linear hydrocarbon-containing compounds having a urethane bond, (2) linear hydrocarbon-containing compounds having a sulfonyl bond, (3) linear hydrocarbon-containing compounds having an oxalic diamide bond, (4) linear hydrocarbon-containing compounds having a diacylhydrazide bond, (5) linear hydrocarbon-containing aliphatic compounds having a urea bond and urethane bond, (6) linear hydrocarbon-containing aliphatic compounds having a urea bond and amide bond, (7) linear hydrocarbon-containing aliphatic compounds having a plurality of urea bonds, (8) linear hydrocarbon-containing cyclic compounds having a urea bond, or (9) linear hydrocarbon-containing cyclic compounds having an amide bond.

* * * * *

UNITED STATES PATENT AND TRADEMARK OFFICE
CERTIFICATE OF CORRECTION

PATENT NO. : 6,794,334 B2
DATED : September 21, 2004
INVENTOR(S) : Yoshihiko Hotta et al.

It is certified that error appears in the above-identified patent and that said Letters Patent is hereby corrected as shown below:

Title page,
Item [73], Assignee, "Miyashi" should read -- Miyoshi --.

Signed and Sealed this

Seventeenth Day of May, 2005

JON W. DUDAS
*Director of the United States Patent and Trademark Office*